United States Patent
Suzuki et al.

(10) Patent No.: US 9,133,949 B2
(45) Date of Patent: Sep. 15, 2015

(54) VALVE SEAT BODY AND VALVE DEVICE

(75) Inventors: Yutaka Suzuki, Kobe (JP); Kaoru Nomichi, Ono (JP); Makoto Ninomiya, Kobe (JP)

(73) Assignee: Kawasaki Jukogyo Kabushiki Kaisha, Kobe-shi (JP)

(*) Notice: Subject to any disclaimer, the term of this patent is extended or adjusted under 35 U.S.C. 154(b) by 333 days.

(21) Appl. No.: 13/699,247

(22) PCT Filed: Aug. 11, 2011

(86) PCT No.: PCT/JP2011/004547
§ 371 (c)(1),
(2), (4) Date: Nov. 20, 2012

(87) PCT Pub. No.: WO2012/032713
PCT Pub. Date: Mar. 15, 2012

(65) Prior Publication Data
US 2013/0075644 A1    Mar. 28, 2013

(30) Foreign Application Priority Data

Sep. 6, 2010 (JP) .................................. 2010-198517
Jan. 31, 2011 (JP) .................................. 2011-018447

(51) Int. Cl.
*F16K 27/00* (2006.01)
*F16K 17/30* (2006.01)
*F16K 31/06* (2006.01)
(Continued)

(52) U.S. Cl.
CPC ............ *F16K 27/00* (2013.01); *F02M 21/0257* (2013.01); *F02M 21/0263* (2013.01);
(Continued)

(58) Field of Classification Search
CPC ....... F16K 27/00; F16K 27/029; F16K 1/422; F16K 17/30; F16K 31/0655; F02M 21/0263; F02M 21/0257; F02M 21/0254
USPC ..................... 251/324, 359, 360, 363, 129.11
See application file for complete search history.

(56) References Cited

U.S. PATENT DOCUMENTS 3,134,572 A * 5/1964 Glasgow ........................ 251/363
5,954,312 A * 9/1999 Earnhardt ........................ 251/48
6,073,911 A * 6/2000 Reiter ........................... 251/324

FOREIGN PATENT DOCUMENTS

JP    A-3-78011    4/1991
JP    A-4-103423   4/1992
(Continued)

OTHER PUBLICATIONS

Nov. 22, 2011 International Search Report issued in International Patent Application No. PCT/JP2011/004547.

*Primary Examiner* — Marina Tietjen
(74) *Attorney, Agent, or Firm* — Oliff PLC

(57) ABSTRACT

A valve device includes a valve body and a valve seat body. The valve seat body has a thick cylindrical shape extending in an axis line direction. The valve seat body includes a seal groove on an outer periphery thereof, the seal groove extending in a circumferential direction. The valve seat body includes a large-diameter portion and a small-diameter portion on an inner periphery thereof, the large-diameter and small-diameter portions connected to each other in the axis line direction. The valve seat body includes a valve seat portion between the large-diameter and small-diameter portions, the valve body being seated on the valve seat portion. The position of the seal groove in the axis line direction coincides with the position of the valve seat portion in the axis line direction or is located on a high-pressure side of the position of the valve seat portion in the axis line direction.

15 Claims, 13 Drawing Sheets

(51) Int. Cl.
*F16K 27/02* (2006.01)
*F16K 1/42* (2006.01)
*F02M 21/02* (2006.01)

(52) U.S. Cl.
CPC ................ *F16K1/422* (2013.01); *F16K 17/30* (2013.01); *F16K 27/029* (2013.01); *F16K 31/0655* (2013.01); *F02M 21/0254* (2013.01)

(56) References Cited

FOREIGN PATENT DOCUMENTS

| | | |
|---|---|---|
| JP | A-7-190007 | 7/1995 |
| JP | A-2005-307972 | 11/2005 |
| JP | A-2006-2861 | 1/2006 |

\* cited by examiner

VALVE SEAT BODY AND VALVE DEVICE

TECHNICAL FIELD

The present invention relates to a valve seat body configured to seal a high-pressure fluid and a valve device including the valve seat body.

BACKGROUND ART

Typically, a valve device is configured such that a valve seat and a valve body configured to be movable in a direction toward and away from the valve seat are included in a valve chest formed in a housing. The valve seat may be formed as a valve seat body separately from the housing and be provided in the valve chest. The valve device is connected to a passage (for example, a pipe) such that a fluid passage extends through the valve chest. The valve device is used to open and close the passage by the opening and closing of a valve and control the flow of the fluid.

FIG. 16 is a cross-sectional view showing the schematic configuration of a conventional valve device. A conventionally typical valve device 100 shown in FIG. 16 is configured such that a valve seat body 5 and a valve body 4 are included in a valve passage formed on a housing 21. The valve passage is constituted by a primary passage 32, a secondary passage 33, and a valve chest 31 provided between the primary passage 32 and the secondary passage 33. The valve seat body 5 having a thick cylindrical shape is provided at a portion of the valve chest 31, the portion being connected to the secondary passage 33. A sealing member 58 seals between the outer periphery of the valve seat body 5 and the inner wall of the valve chest 31. The inner periphery of the valve seat body 5 is a communication passage 50 configured to cause the valve chest 31 and the secondary passage 33 to communicate with each other. A valve seat portion 54 is formed at an opening edge of the communication passage 50, the opening edge being located on the primary passage 32 side. The valve body 4 is provided in the valve chest 31 so as to be able to move toward and away from the valve seat portion 54. In the valve device 100 configured as above, the valve is closed when the valve body 4 is seated on the valve seat portion 54, and the valve opens when the valve body 4 separates from the valve seat portion 54.

In the conventional valve device, normally, the housing and the valve body are made of metal and have high stiffness. In addition, known as the valve seat body configured separately from the housing are a valve seat body made of a synthetic resin (see PTL 1) and a valve seat body made of metal and having a valve seat portion to which a sheet member made of a soft material, such as a resin, is bonded (see PTL 2). As above, the airtightness of the valve is improved by configuring at least the valve seat portion of the valve seat body by using the resin.

CITATION LIST

Patent Literature

PTL 1: Japanese Laid-Open Patent Application Publication No. 2005-307972
PTL 2: Japanese Laid-Open Patent Application Publication No. 2006-2861

SUMMARY OF INVENTION

Technical Problem

Known as one of the resins used for the valve seat body is so-called engineering plastic that is a synthetic resin having excellent strength. The valve seat body made of the engineering plastic is generally used in the valve device configured such that the maximum pressure of a fluid sealed by the valve is in a range equal to or lower than high pressure (for example, 35 MPa). In other words, the conventional valve seat body made of the engineering plastic does not have such strength that can resist fluid pressure higher than the above high pressure.

In the conventional valve device 100 shown in FIG. 16, when the valve is closed, fluid pressure (primary pressure $P_1$) in the primary passage 32 acts on each of an end surface of the valve seat body 5 which surface is located on the primary passage 32 side and an outer peripheral surface of the valve seat body 5 which surface is located from an end portion located on the primary passage 32 side up to a portion contacting the sealing member 58. Similarly, fluid pressure (secondary pressure $P_2$) in the secondary passage 33 acts on each of an inner peripheral surface of the valve seat body 5, an end surface of the valve seat body 5 which surface is located on the secondary passage 33 side, and an outer peripheral surface of the valve seat body 5 which surface is located from an end portion located on the secondary passage 33 side up to a portion contacting the sealing member 58. Therefore, in the valve seat body 5, there exists a portion (a portion shown in gray in FIG. 16) where pressure (internal pressure) applied in a radial direction from the inner peripheral surface side and pressure (external pressure) applied in the radial direction from the outer peripheral surface side do not balance. If the difference between the internal pressure and external pressure applied to this portion is large, the valve seat body deforms or breaks. As above, when sealing the fluid of higher pressure than the maximum fluid pressure set for the valve device, the conventional valve seat body deforms or breaks due to strength poverty.

In the case of the strength poverty of the valve seat body as above, the problem of the strength poverty can be resolved by using a metal valve seat body disclosed in PTL 2 instead of the resin valve seat body. However, even in the case of the metal valve seat body, it is necessary to, for example, increase the thickness of the metal valve seat body in order to resolve the problem of the strength poverty.

In consideration of the above circumstances, an object of the present invention is to provide a valve seat body having a simple configuration and capable of sealing a high-pressure fluid, and a valve device including the valve seat body.

Solution to Problem

A valve seat body according to the present invention is a valve seat body having a thick cylindrical shape and including: a valve seat portion on which a valve body is seated; a first sealing member provided portion provided on an outer periphery of the valve seat body; a large-diameter portion and a small-diameter portion provided on an inner periphery of the valve seat body; and a valve seat portion provided between the large-diameter portion and the small-diameter portion, wherein: the large-diameter portion has an inner diameter larger than an outer diameter of the valve body configured to move into the large-diameter portion such that the valve body moves into the large-diameter portion from an axis line direction; the small-diameter portion has an inner diameter smaller than the outer diameter of the valve body; and a position of the first sealing member provided portion in the axis line direction overlaps a position of the valve seat portion in the axis line direction or is located on a high-pressure side of a position where the position of the first sealing member provided portion in the axis line direction overlaps the position of the valve seat portion in the axis line direction. Here, the "outer diameter of the valve body" denotes the largest outer diameter of a portion of the valve body, the portion being inserted into the inner periphery of the valve seat body. In a case where the outer diameter of the portion of the valve body which is inserted into the inner periphery of the valve seat body changes, for example, in a case where the portion of the valve body which is inserted into the inner periphery of the valve seat body includes a large-diameter portion and a small-diameter portion located on a tip end side of the large-diameter portion, and the valve portion seated on the valve seat portion of the valve seat body is provided between the large-diameter portion and the small-diameter portion, the large-diameter portion of the valve seat body has a larger inner diameter than the large-diameter portion of the valve body, and the small-diameter portion of the valve seat body has an inner diameter smaller than an inner diameter of the large-diameter portion of the valve body and larger than an inner diameter of the small-diameter portion of the valve body.

The valve device according to the present invention includes: a housing; the valve seat body accommodated in the housing; the valve body provided to be movable in the axis line direction between a closed position where the valve body is seated on the valve seat portion of the valve seat body and an open position where the valve body separates from the seat portion; and a first sealing member provided at the first sealing member provided portion of the valve seat body to seal between the housing and the valve seat body.

In the foregoing, the "position of the first sealing member provided portion in the axis line direction" denotes an axis-line-direction position of a portion where the sealing member provided at the first sealing member provided portion seals between the valve seat body and a member in which the valve seat body is accommodated. Moreover, the "axis-line-direction position" denotes a z-coordinate when the reference axis line is regarded as a z-axis and a certain point on the z-axis is regarded as an origin. Further, the "high-pressure side" denotes a high-pressure side between an upstream side and downstream side of the valve seat body when the valve seat body or valve device provided in the fluid becomes the valve-closed state.

In the valve seat body and valve device configured as above, if the axis-line-direction position of the first sealing member provided portion and the axis-line-direction position of the valve seat portion overlap each other, the position where the first sealing member provided at the first sealing member provided portion seals between the valve seat body and a member (housing) provided at the outer periphery of the valve seat body and the position where the valve body seated on the valve seat portion seals between the valve seat body and the valve body overlap in the axis line direction. Therefore, when the valve body is seated on the valve seat body and the valve-closed state is realized, the pressure (internal pressure) acting in the radial direction from the inner periphery side of the valve seat body and the pressure (external pressure) acting in the radial direction from the outer periphery side of the valve seat body substantially balance over a region extending in the axis line direction. With this, stress having the magnitude by which the valve seat body deforms or breaks does not act on the valve seat body, and the valve seat body is prevented from deforming and breaking. Moreover, in the valve seat body and valve device configured as above, if the axis-line-direction position of the first sealing member provided portion is located on the high-pressure side of the axis-line-direction position of the valve seat portion, the internal pressure higher than the external pressure acts in the valve-closed state on a region between the axis-line-direction position of the first sealing member provided portion of the valve seat body and the axis-line-direction position of the valve seat portion, and an internal pressure load condition is realized. As above, although there exists the region where an imbalance between the internal pressure and the external pressure occurs in the valve seat body, the internal pressure load condition is realized. Therefore, even if the difference between the internal pressure and external pressure acting on the valve seat body significantly increases, the valve seat body is prevented from deforming or breaking. Therefore, in the valve seat body and valve device according to the present invention, the pressure resistance of the valve seat body can be improved by the shape of the valve seat body without increasing the thickness or using a high-strength material.

In the valve seat body, the position of the valve seat portion in the axis line direction and a position of a contact portion of a first sealing member in the axis line direction may overlap each other, the first sealing member being provided at the first sealing member provided portion, the contact portion contacting the outer periphery of the valve seat body when the first sealing member receives fluid pressure to be compressed and deform.

In the valve seat body, the position of the valve seat portion in the axis line direction may be located within a height range of a first sealing member in the axis line direction when the first sealing member receives fluid pressure to be compressed and deform, the first sealing member being provided at the first sealing member provided portion.

In the valve seat body, the position of the first sealing member provided portion of the valve seat body in the axis line direction may be located between the valve seat portion of the valve seat body and an end portion of the valve seat body, the end portion being located on the high-pressure side.

Further, in the valve device, the housing may have a thick cylindrical shape and include an accommodating portion formed at an inner periphery thereof and configured to accommodate the valve seat body and a second sealing member provided portion formed on an outer periphery thereof and extending in a circumferential direction; and a position of the second sealing member provided portion in the axis line direction may overlap the position of the first sealing member provided portion in the axis line direction or may be located on the high-pressure side of a position where the position of the second sealing member provided portion in the axis line direction overlaps the position of the first sealing member provided portion in the axis line direction.

In the valve device configured as above, if the axis-line-direction position of the second sealing member provided portion and the axis-line-direction position of the first sealing member overlap each other, the position where the second sealing member provided at the second sealing member provided portion seals between the housing and a member provided at the outer periphery of the housing and the position where the first sealing member provided at the first sealing member provided portion seals between the housing and the valve seat body overlap in the axis line direction. Therefore, when the valve body is seated on the valve seat body and the valve-closed state is realized, the pressure (internal pressure) acting in the radial direction from the inner periphery side of the valve seat body and the pressure (external pressure) acting in the radial direction from the outer periphery side of the valve seat body substantially balance over a region extending in the axis line direction. With this, stress having the magnitude by which the housing deforms or breaks does not act on the housing, and the housing is prevented from deforming and breaking. Moreover, in the valve device configured as above, if the axis-line-direction position of the second sealing member provided portion is located on the high-pressure side of the axis-line-direction position of the first sealing member, the internal pressure higher than the external pressure acts in the valve-closed state on a region between the axis-line-direction position of the second sealing member provided portion of the housing and the axis-line-direction position of the first sealing member provided portion, and the internal pressure load condition is realized. As above, although there exists the region where an imbalance between the internal pressure and the external pressure occurs in the housing, the internal pressure load condition is realized. Therefore, even if the difference between the internal pressure and external pressure acting on the housing significantly increases, the housing is prevented from deforming or breaking. Therefore, in the valve device according to the present invention, the pressure resistance of the housing can be improved by the shape of the housing without increasing the thickness or using a high-strength material.

In the valve device, a height range of the second sealing member in the axis line direction when the second sealing member receives fluid pressure to be compressed and deform and the height range of the first sealing member in the axis line direction when the first sealing member receives the fluid pressure to be compressed and deform may at least partially overlap each other.

In the valve device, the position of the second sealing member provided portion of the housing in the axis line direction may be located between the first sealing member provided portion of the valve body portion and an end portion of the housing, the end portion being located on the high-pressure side.

Advantageous Effects of Invention

In the valve seat body or valve device according to the present invention, in the valve-closed state, the internal pressure and external pressure acting on the valve seat body balance over the entire region of the valve seat body extending in the entire axis line direction or do not balance partially. Thus, stress having the magnitude by which the valve seat body deforms or breaks does not act on the valve seat body. To be specific, the pressure resistance of the valve seat body can be improved by the shape of the valve seat body without increasing the thickness or using a high-strength material.

DESCRIPTION OF EMBODIMENTS

Figure 1:
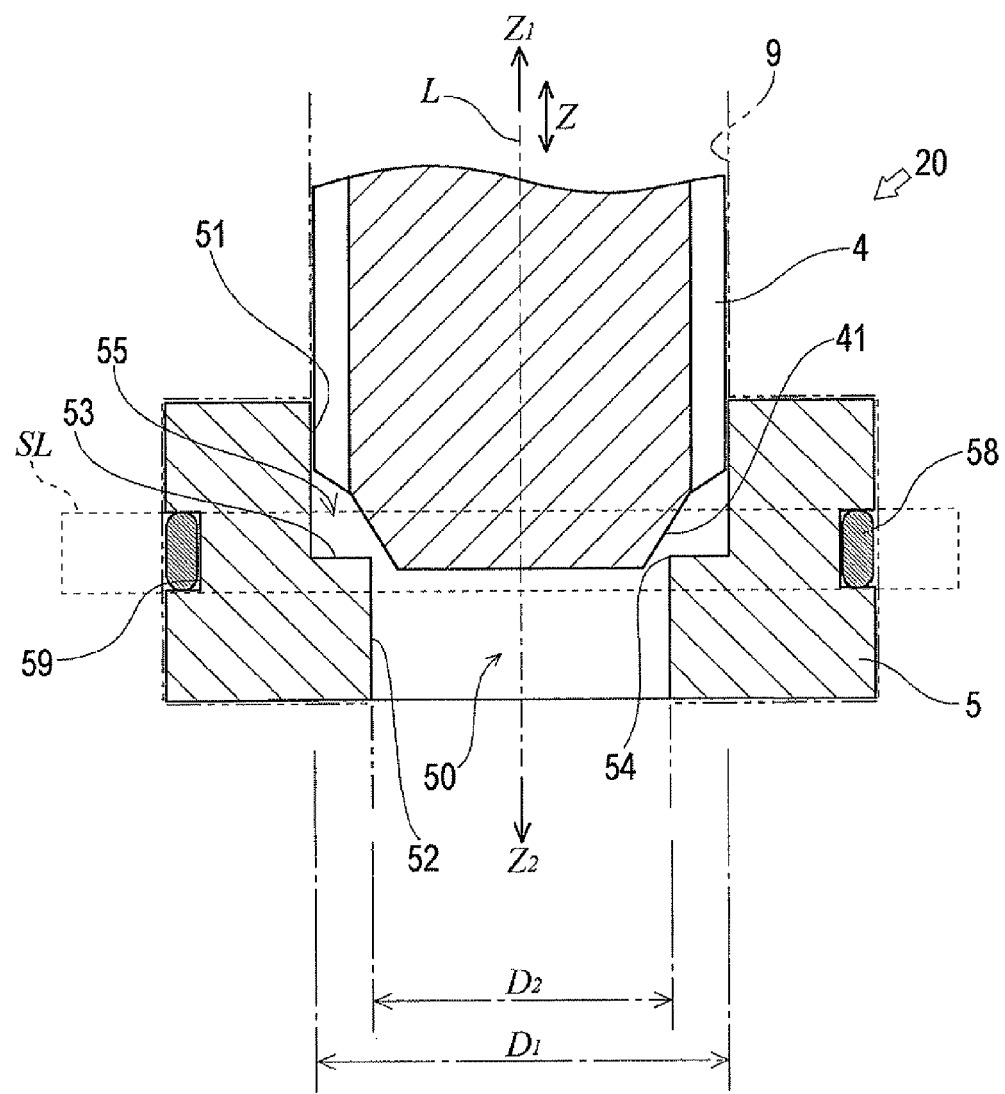
FIG. 1 is a cross-sectional view showing the schematic configuration of a valve device (valve-open state) according to the present invention.

Hereinafter, embodiments of the present invention will be explained in detail in reference to the drawings. In the drawings, the same reference signs are used for the same or corresponding components, and a repetition of the same explanation is avoided.

Figure 2:
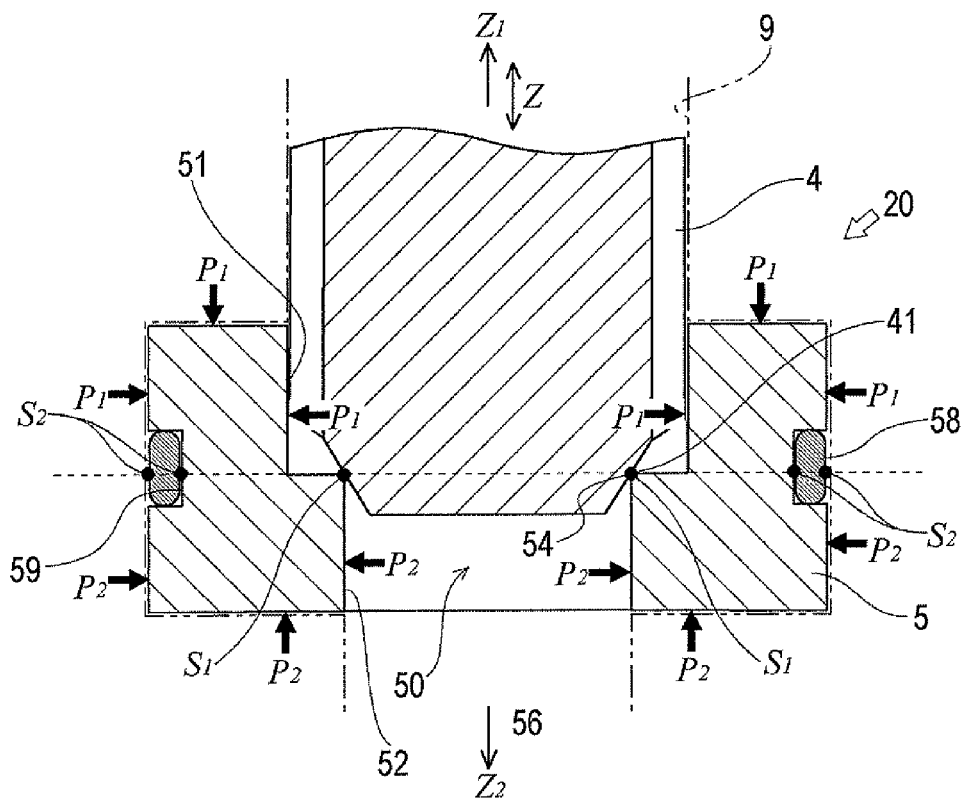
FIG. 2 is a cross-sectional view showing the schematic configuration of the valve device (valve-closed state).

Each of FIGS. 1 and 2 is a schematic cross-sectional view of a valve device 20 according to the present invention. FIG. 1 shows a valve-open state, and FIG. 2 shows a valve-closed state. As shown in FIGS. 1 and 2, the valve device 20 includes a valve body 4 and a valve seat body 5. The valve body 4 includes a valve portion 41, and the valve seat body 5 includes a valve seat portion 54. The valve device 20 is provided on a passage of a fluid flowing from a primary side (supply side) to a secondary side (discharge side). The valve device 20 controls the flow of the fluid in such a manner that the valve portion 41 of the valve body 4 is seated on the valve seat portion 54 of the valve seat body 5 or separates from the valve seat portion 54 of the valve seat body 5. The valve device 20 has a reference axis line L. The valve body 4 and the valve seat body 5 are provided such that each of axis lines thereof coincides with the reference axis line L. Hereinafter, an upper side in each drawing in an axis line direction Z along the reference axis line L is referred to as a "$Z_1$ direction" or a "$Z_1$ side", and a lower side in each drawing in the axis line direction Z along the reference axis line L is referred to as a "$Z_2$ direction" or a "$Z_2$ side".

The valve seat body 5 has a thick cylindrical shape whose center line corresponds to the reference axis line L. The valve seat body 5 is made of engineering plastic as one piece. Here, the engineering plastic is a synthetic resin having excellent mechanical strength and heat resistance, generally having a heatproof temperature of 100° C. or more, a tensile strength of 500 kgf/cm$^2$ or more, and a bending elastic modulus of 20,000 kg/cm$^2$ or more. However, the valve seat body 5 is not limited to the synthetic resin, such as the engineering plastic, and may be made of a metal.

Figure 3:
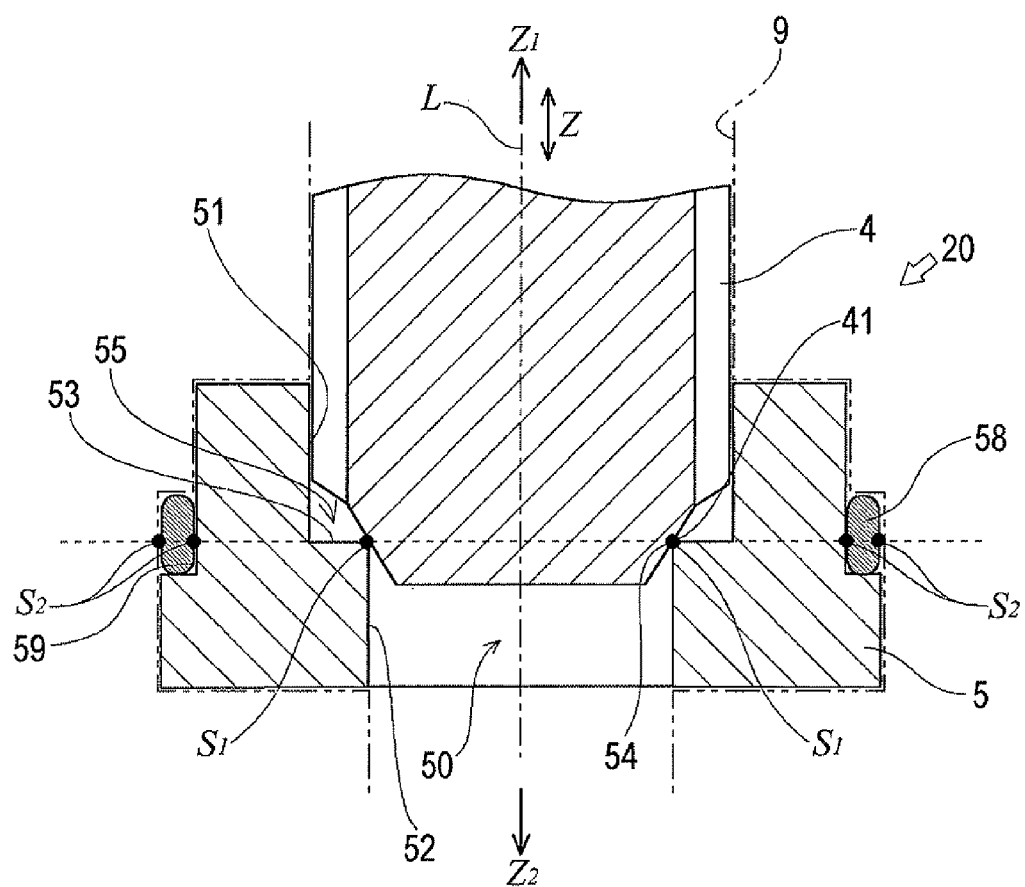
FIG. 3 is a diagram showing another example of a sealing member provided portion of the valve seat body.

The valve seat body 5 is accommodated in an accommodating portion 9 having an inner peripheral shape corresponding to an outer peripheral shape of the valve seat body 5. The accommodating portion 9 constitutes a part of a valve passage formed, for example, on a housing. A seal groove 59 is formed as a sealing member provided portion on the outer periphery of the valve seat body 5. The seal groove 59 is a circular recess extending in a circumferential direction on the outer periphery of the valve seat body 5. In FIGS. 1 and 2, the sealing member provided portion is formed as the seal groove 59 at an axis-line-direction-Z intermediate position of the valve seat body 5. However, as shown in FIG. 3, the sealing member provided portion may be formed as a cutout (step portion) formed between a $Z_1$-side end portion and $Z_2$-side end portion of the valve seat body 5. A circular sealing member 58 is provided at the seal groove 59 and stops the flow of the fluid between the inner periphery of the accommodating portion 9 and the outer periphery of the valve seat body 5. A portion between the inner periphery of the accommodating portion 9 and the outer periphery of the valve seat body 5, which is sealed by the sealing member 58 as above, is referred to as a "second seal portion $S_2$".

A $Z_1$-side large-diameter portion 51 and a $Z_2$-side small-diameter portion 52 are formed at the inner periphery of the thick cylinder of the valve seat body 5. The inside of the large-diameter portion 51 constitutes a part of a valve body chest 55 in which the valve body 4 is accommodated, and the valve body chest 55 communicates with the primary side. The large-diameter portion 51 has a first passage diameter $D_1$ larger than an outer diameter of the valve body 4 such that the valve body 4 can move into the large-diameter portion 51 from the $Z_1$ side. The inside of the small-diameter portion 52 is a communication passage 50 connecting the valve body chest 55 and the secondary side. The small-diameter portion 52 has a second passage diameter $D_2$ smaller than each of the first passage diameter $D_1$ and the outer diameter of the valve body 4. The large-diameter portion 51 and the small-diameter portion 52 are connected to each other in the axis line direction Z. The valve seat portion 54 is formed on a stepped surface 53 where the inner diameter changes from the large-diameter portion 51 to the small-diameter portion 52, the stepped surface 53 facing in the $Z_1$ direction. An axis-line-direction-Z position of the valve seat portion 54 overlaps an axis-line-direction-Z position of the seal groove 59. Here, the "axis-line-direction-Z position" denotes a z-coordinate when the reference axis line L is regarded as a z-axis and a certain point on the z-axis is regarded as an origin. Here, the "outer diameter of the valve body" denotes the largest outer diameter of a portion of the valve body 4, the portion being inserted into the inner periphery of the valve seat body 5. In a case where the outer diameter of the portion of the valve body 4 which is inserted into the inner periphery of the valve seat body 5 changes, for example, in a case where the portion of the valve body 4 which is inserted into the inner periphery of the valve seat body 5 includes a large-diameter portion and a small-diameter portion located on a tip end side of the large-diameter portion, and the valve portion 41 seated on the valve seat portion 54 of the valve seat body 5 is provided between the large-diameter portion and the small-diameter portion, the large-diameter portion of the valve seat body 5 has a larger inner diameter than the large-diameter portion of the valve body 4, and the small-diameter portion of the valve seat body 5 has an inner diameter smaller than an inner diameter of the large-diameter portion of the valve body 4 and larger than an inner diameter of the small-diameter portion of the valve body 4.

The valve body 4 is a columnar body extending in the axis line direction Z. A $Z_2$-side end portion of the valve body 4 is inserted into the large-diameter portion 51 of the valve seat body 5 from the $Z_1$ side. The valve body 4 is provided with the valve portion 41 seated on the valve seat portion 54 of the valve seat body 5. The valve body 4 can reciprocate in the axis line direction Z in the valve body chest 55 between a valve-closed position where the valve portion 41 is seated on the valve seat portion 54 to close the valve passage and a valve-open position where the valve portion 41 separates from the valve seat portion 54 to open the valve passage. A portion between the valve seat body 5 and the valve body 4, which is sealed by the valve portion 41 seated on the valve seat portion 54 when the valve body 4 is located at the valve-closed position, is referred to as a "first seal portion $S_1$". The first seal portion $S_1$ on the valve seat body 5 side is the valve seat portion 54, and the first seal portion $S_1$ on the valve body 4 side is the valve portion 41.

Figure 4:
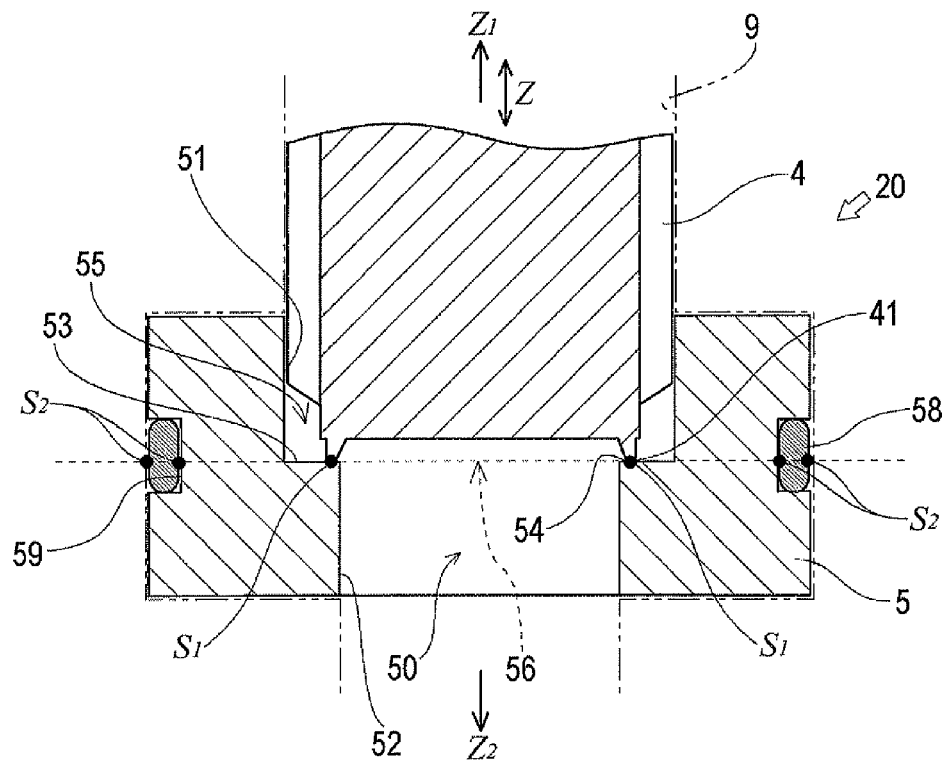
FIG. 4 is a diagram showing another example of a valve portion of the valve body.

In the valve device 20 shown in FIGS. 1 and 2, the valve seat portion 54 is formed at an inner peripheral edge of the stepped surface 53 of the inner periphery of the valve seat body 5, and the valve portion 41 is formed at a chamfered edge of a $Z_2$-side end surface of the valve body 4. However, the combination of the shape of the valve seat portion 54 and the shape of the valve portion 41 is not limited to this. For example, as shown in FIG. 4, the valve seat portion 54 may be formed on the stepped surface 53 of the valve seat body 5, and the valve portion 41 may be formed at an annular lip-shaped tip end projecting from the $Z_2$-side end surface of the valve body 4. In this case, the first seal portion $S_1$ on the valve seat body 5 side is a portion of the stepped surface 53 of the valve seat body 5, the portion contacting the valve portion 41, and the first seal portion $S_1$ on the valve body 4 side is the valve portion 41.

At the second seal portion $S_2$ in the valve device 20, a portion between the accommodating portion 9 and the valve seat body 5 is practically sealed by an outer periphery contact portion where the inner periphery of the accommodating portion 9 and the outer periphery of the sealing member 58 contact each other and an inner periphery contact portion where the outer periphery of the valve seat body 5 and the inner periphery of the sealing member 58 contact each other. The sealing member 58 is a rubber ring. Depending on a use situation of the valve device 20, the sealing member 58 receives the fluid pressure to be compressed and deform. The sealing member 58 having deformed by the pressure may contact the outer peripheral surface of the valve seat body 5 and the inner peripheral surface of the accommodating portion 9 by an area wider than a line, and the outer periphery contact portion and the inner periphery contact portion may differ in position from each other in the axis line direction Z. In consideration of the above circumstances, an axis-line-direction-Z height range of the sealing member 58 when the sealing member 58 provided at the seal groove 59 receives the fluid pressure to be compressed and deform is referred to as a "seal range SL", and when the axis-line-direction-Z position of the first seal portion $S_1$ is located within this seal range SL, it is possible to describe that "the axis-line-direction-Z position of the first seal portion $S_1$ and the axis-line-direction-Z position of the second seal portion $S_2$ overlap each other".

In the valve device 20, the axis-line-direction-Z position of the first seal portion $S_1$ and the axis-line-direction-Z position of the second seal portion $S_2$ overlap each other. It should be noted that it is most desirable that the axis-line-direction-Z position of the first seal portion $S_1$ and the axis-line-direction-Z position of the second seal portion $S_2$ overlap each other and an axis-line-direction-Z center position of the sealing member 58 when the sealing member 58 provided at the seal groove 59 receives the fluid pressure to be compressed and deform and the axis-line-direction-Z position of the first seal portion $S_1$ overlap each other.

In FIG. 2, in the valve device 20 in the valve-closed state, primary side pressure acting on the valve seat body 5 is shown by an arrow of the primary pressure $P_1$, and secondary side pressure acting on the valve seat body 5 is shown by an arrow of the secondary pressure $P_2$. The primary pressure $P_1$ acts on a portion of the outer periphery of the valve seat body 5 in the valve-closed state, the portion being located on the $Z_1$ side of the second seal portion $S_2$. The secondary pressure $P_2$ acts on a portion of the outer periphery of the valve seat body 5 in the valve-closed state, the portion being located on the $Z_2$ side of the second seal portion $S_2$. Moreover, the primary pressure $P_1$ acts on the large-diameter portion 51 of the inner periphery of the valve seat body 5 in the valve-closed state, the large-diameter portion 51 being located on the $Z_1$ side of the first seal portion. $S_1$. The secondary pressure $P_2$ acts on the small-diameter portion 52 of the inner periphery of the valve seat body 5 in the valve-closed state, the small-diameter portion 52 being located on the $Z_2$ side of the first seal portion $S_1$. Since the axis-line-direction-Z position of the first seal portion $S_1$ and the axis-line-direction-Z position of the second seal portion $S_2$ overlap each other or are very close to each other, pressure (hereinafter may be referred to as "internal pressure") acting in the radial direction from the inner peripheral surface of the valve seat body 5 in the valve-closed state and pressure (hereinafter may be referred to as "external pressure") acting in the radial direction from the outer peripheral surface of the valve seat body 5 in the valve-closed state substantially balance over a region extending in the axis line direction Z. As a result, stress by which the valve seat body 5 deforms or breaks does not act on the valve seat body 5, or even if stress acts on the valve seat body 5, the stress does not have the magnitude by which the valve seat body 5 deforms or breaks.

As described above, the valve seat body 5 has such a shape that the axis-line-direction-Z position of the first seal portion $S_1$ and the axis-line-direction-Z position of the second seal portion $S_2$ overlap each other or are close to each other. With this, the pressure resistance of the valve seat body 5 in the valve-closed state is improved. To be specific, the pressure resistance of the valve seat body 5 is improved by the shape of the valve seat body 5 without increasing the thickness or using a higher-strength material. In addition, this shape of the valve seat body 5 is a simple shape which does not require special processing and can be easily manufactured by conventional resin molding processes and cutting operations. Then, the valve device 20 including the valve seat body 5 having the high pressure resistance can be provided on the flow of the fluid of higher pressure than before. For example, the valve device 20 including the valve seat body 5 made of the engineering plastic can be used to seal the fluid of ultra-high pressure (for example, about 70 MPa) higher than conventional high pressure (about 35 MPa).

Next, the results of Numerical Calculations 1 and 2 performed to exemplify the strength of the valve seat body 5 of the valve device 20 configured as above will be explained.

Numerical Calculation 1

Figure 5:
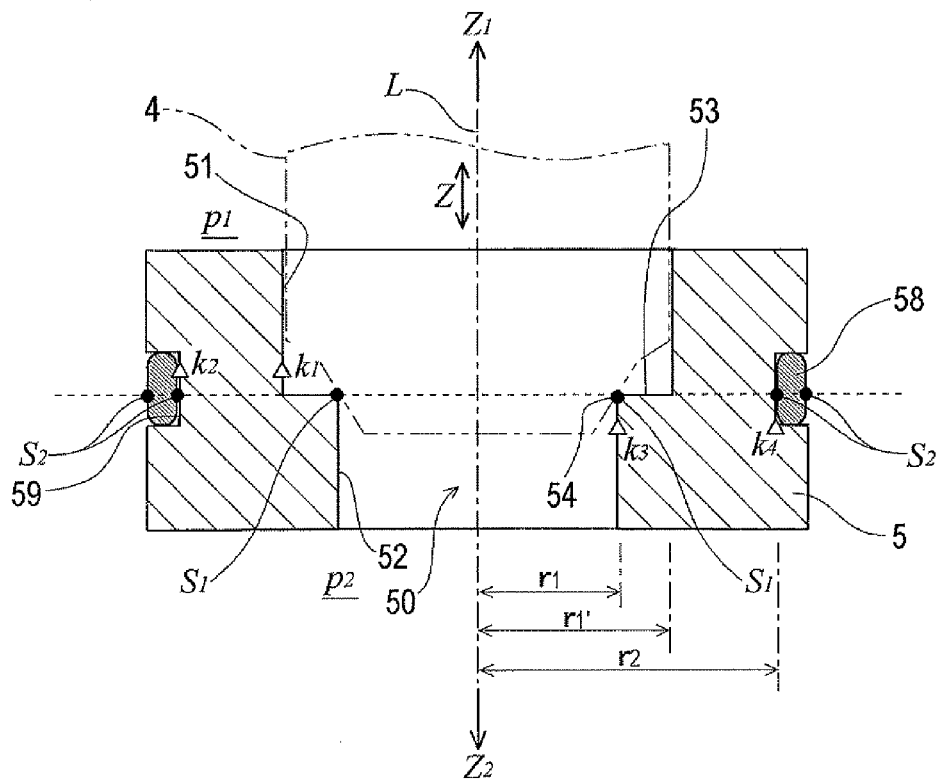
FIG. 5 is a cross-sectional view showing a numerical calculation model of the valve seat body according to the present invention.
Figure 6:
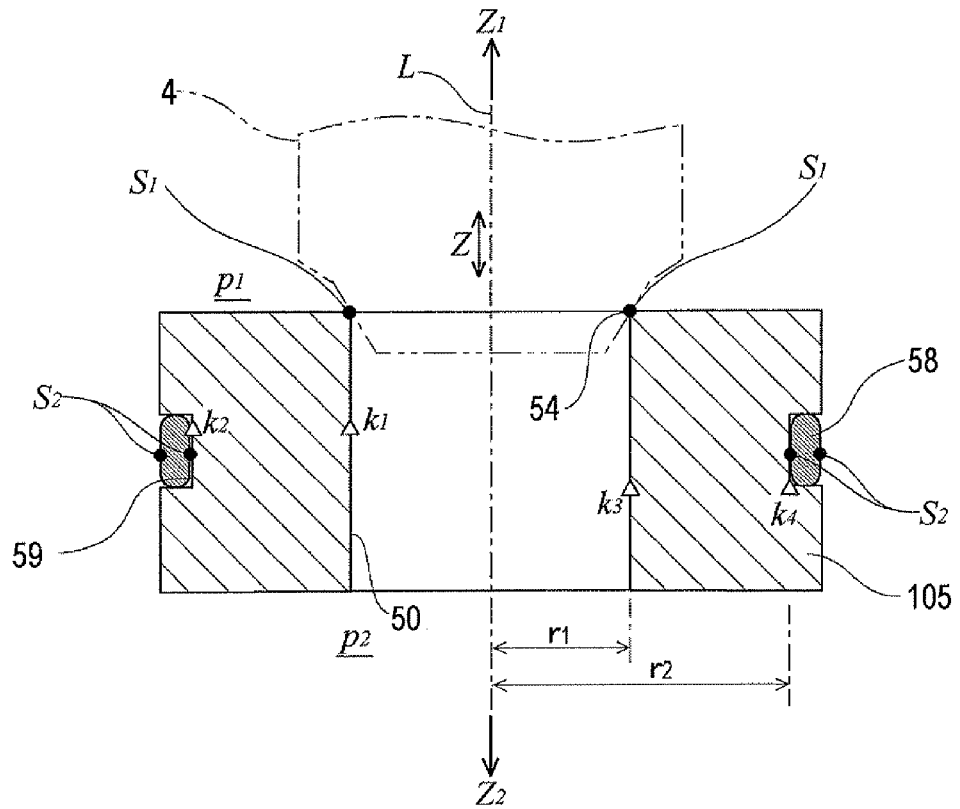
FIG. 6 is a cross-sectional view showing a numerical calculation model of the valve seat body according to Comparative Example.

In Numerical Calculation 1, the valve seat body 5 according to the present invention and a valve seat body 105 according to Comparative Example were modeled, and the magnitudes of the stresses acting on each valve seat body in the valve-closed state were calculated. FIG. 5 is a cross-sectional view of a numerical calculation model of the valve seat body according to the present invention. FIG. 6 is a cross-sectional view of a numerical calculation model of the valve seat body according to Comparative Example. As shown in FIG. 5, the numerical calculation model of the valve seat body 5 according to the present invention is a thick cylindrical body having two inner diameters that are large and small inner diameters. The inner radius of the small-diameter portion 52 is $r_1$. The inner radius of the large-diameter portion 51 is $r_1'$. The smallest radius of the sealing member 58 contacting the valve seat body 5 is $r_2$. As shown in FIG. 6, the numerical calculation model of the conventional valve seat body 105 according to Comparative Example is a thick cylindrical body. The inner radius of the valve seat body 105 is $r_1$, and the smallest radius of the sealing member 58 contacting the valve seat body 105 is $r_2$. In the valve seat body 105 according to Comparative Example, the valve seat portion 54 is formed at a $Z_1$-side end portion of the valve seat body 105, and the seal groove 59 and the sealing member 58 are provided on the $Z_2$ side of the valve seat portion 54. In the valve seat body 105 according to Comparative Example, the first seal portion $S_1$ is located on the $Z_1$ side of the second seal portion $S_2$.

In the valve seat body 5, calculation target portions are a first portion $k_1$ located on the inner peripheral surface and on the $Z_1$ side of the first and second seal portions $S_1$ and $S_2$, a second portion $k_2$ located on the outer peripheral surface and on the $Z_1$ side of the first and second seal portions $S_1$ and $S_2$, a third portion $k_3$ located on the inner peripheral surface and on the $Z_2$ side of the first and second seal portions $S_1$ and $S_2$, and a fourth portion $k_4$ located on the outer peripheral surface and on the $Z_2$ side of the first and second seal portions $S_1$ and $S_2$. In the valve seat body 105 according to Comparative Example, calculation target portions are a first portion $k_1$ located on the inner peripheral surface and on the $Z_2$ side of the first seal portion $S_1$ and on the $Z_1$ side of the second seal portion $S_2$, a second portion $k_2$ located on the outer peripheral surface and on the $Z_2$ side of the first seal portion $S_1$ and on the $Z_1$ side of the second seal portion $S_2$, a third portion $k_3$ located on the inner peripheral surface and on the $Z_2$ side of the first and second seal portions $S_1$ and $S_2$, and a fourth portion $k_4$ located on the outer peripheral surface and on the $Z_2$ side of the first and second seal portions $S_1$ and $S_2$. The calculation target portions $k_1$, $k_2$, $k_3$, and $k_4$ of the valve seat body 5 respectively correspond to the calculation target portions $k_1$, $k_2$, $k_3$, and $k_4$ of the valve seat body 105 according to Comparative Example. The axis-line-direction-Z positions of the calculation target portions $k_1$ and $k_2$ are substantially the same as each other, and the axis-line-direction-Z positions of the calculation target portions $k_3$ and $k_4$ are substantially the same as each other.

Regarding each of the calculation target portions $k_1$, $k_2$, $k_3$, and $k_4$ of the valve seat bodies 5 and 105, $r_2$ was set to $2 \times r_1$, and radial stress $\sigma_r$, circumferential stress $\sigma_\theta$, and maximum principal shear stress $\tau$ in each of a case (hereinafter referred to as "Case 1") where the primary pressure $P_1$ is $p_1$ and the secondary pressure $P_2$ is 0 and a case (hereinafter referred to as "Case 2") where the primary pressure $P_1$ is 0 and the secondary pressure $P_2$ is $p_2$ were calculated.

Figure 7:
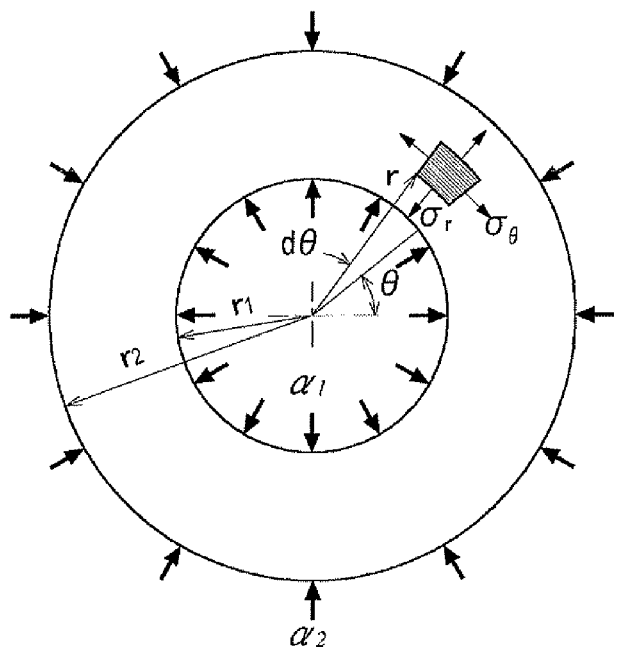
FIG. 7 is a diagram for explaining stress which acts when internal pressure and external pressure are applied to a thick cylinder.

In the calculations of the magnitudes of the stresses acting on the numerical calculation models of the valve seat bodies 5 and 105, a stress calculation formula of a typical thick cylinder was utilized. FIG. 7 is a diagram for explaining the stresses which act when the internal pressure and the external pressure are applied to the thick cylinder. Each of the valve seat bodies 5 and 105 was regarded as a thick cylinder in which the radius of the inner periphery was $r_1$ and the radius of the outer periphery was $r_2$ as shown in FIG. 7. It was presumed that internal pressure α1 and external pressure α2 were acting on the thick cylinder. With this, the radial stress $\sigma_r$, the circumferential stress $\sigma_\theta$, and the maximum principal shear stress $\tau$ acting on a portion having a radius r and located at an angle θ were calculated. The radial stress $\sigma_r$ acting on the thick cylinder can be calculated by utilizing Formula 1 below. The circumferential stress $\sigma_\theta$ acting on the thick cylinder can be calculated by utilizing Formula 2 below. The maximum principal shear stress $\tau$ acting on the thick cylinder can be calculated by utilizing Formula 3 below.

$$\sigma_r = \frac{\alpha_1 r_1^2 - \alpha_2 r_2^2}{r_2^2 - r_1^2} - \frac{r_1^2 r_2^2}{r^2(r_2^2 - r_1^2)}(\alpha_1 - \alpha_2) \quad \text{Formula 1}$$

$$\sigma_\theta = \frac{\alpha_1 r_1^2 - \alpha_2 r_2^2}{r_2^2 - r_1^2} + \frac{r_1^2 r_2^2}{r^2(r_2^2 - r_1^2)}(\alpha_1 - \alpha_2) \quad \text{Formula 2}$$

$$\tau = \frac{1}{2}(\sigma_\theta - \sigma_r) = \frac{r_1^2 r_2^2(\alpha_1 - \alpha_2)}{r^2(r_2^2 - r_1^2)} \quad \text{Formula 3}$$

TABLE I

| Position | Valve Seat Body of Present Invention | | Valve Seat Body of Comparative Example | |
|---|---|---|---|---|
| | Case 1 (primary pressure = $p_1$, secondary pressure = 0) | Case 2 (primary pressure = 0, secondary pressure = $p_2$) | Case 1 (primary pressure = $p_1$, secondary pressure = 0) | Case 2 (primary pressure = 0, secondary pressure = $p_2$) |
| First Portion | $\sigma_r = -p_1$ $\sigma_\theta = -p_1$ $\tau = 0$ | $\sigma_r = 0$ $\sigma_\theta = 0$ $\tau = 0$ | $\sigma_r = 0$ $\sigma_\theta = -2.67p_1$ $\tau = -1.33p_1$ | $\sigma_r = -p_2$ $\sigma_\theta = 1.67p_2$ $\tau = 1.33p_2$ |
| Second Portion | $\sigma_r = -p_1$ $\sigma_\theta = -p_1$ $\tau = 0$ | $\sigma_r = 0$ $\sigma_\theta = 0$ $\tau = 0$ | $\sigma_r = -p_1$ $\sigma_\theta = -1.67p_1$ $\tau = -0.33p_1$ | $\sigma_r = 0$ $\sigma_\theta = 0.67p_2$ $\tau = 0.33p_2$ |
| Third Portion | $\sigma_r = 0$ $\sigma_\theta = 0$ $\tau = 0$ | $\sigma_r = -p_2$ $\sigma_\theta = -p_2$ $\tau = 0$ | $\sigma_r = 0$ $\sigma_\theta = 0$ $\tau = 0$ | $\sigma_r = -p_2$ $\sigma_\theta = -p_2$ $\tau = 0$ |
| Fourth Portion | $\sigma_r = 0$ $\sigma_\theta = 0$ $\tau = 0$ | $\sigma_r = -p_2$ $\sigma_\theta = -p_2$ $\tau = 0$ | $\sigma_r = 0$ $\sigma_\theta = 0$ $\tau = 0$ | $\sigma_r = -p_2$ $\sigma_\theta = -p_2$ $\tau = 0$ |

Table 1 above shows the calculation results of Numerical Calculation 1. In Case 1, in the valve seat body 5 according to the present invention, the radial stress $\sigma_r$ and circumferential stress $\sigma_\theta$ acting on the first portion $k_1$ and the radial stress $\sigma_r$ and circumferential stress $\sigma_\theta$ acting on the second portion $k_2$ balance. Similarly, the radial stress $\sigma_r$ and circumferential stress $\sigma_\theta$ acting on the third portion $k_3$ and the radial stress $\sigma_r$ and circumferential stress $\sigma_\theta$ acting on the fourth portion $k_4$ balance. It is clear from the calculation results that in Case 1, the internal pressure and external pressure acting on the valve seat body 5 balance.

In contrast, in Case 1, in the valve seat body 105 according to Comparative Example, the radial stress $\sigma_r$ and circumferential stress $\sigma_\theta$ acting on the first portion $k_1$ and the radial stress $\sigma_r$ and circumferential stress $\sigma_\theta$ acting on the second portion $k_2$ do not balance. However, the radial stress $\sigma_r$ and circumferential stress $\sigma_\theta$ acting on the third portion $k_3$ and the radial stress $\sigma_r$ and circumferential stress $\sigma_\theta$ acting on the fourth portion $k_4$ balance. Therefore, it is clear that in Case 1, an imbalance between the internal pressure and external pressure acting on the $Z_1$ side of the second seal portion $S_2$ of the valve seat body 105 has occurred.

In Case 2, in the valve seat body 5 according to the present invention, the radial stress $\sigma_r$ and circumferential stress $\sigma_\theta$ acting on the first portion $k_1$ and the radial stress $\sigma_r$ and circumferential stress $\sigma_\theta$ acting on the second portion $k_2$ balance. Similarly, the radial stress $\sigma_r$ and circumferential stress $\sigma_\theta$ acting on the third portion $k_3$ and the radial stress $\sigma_r$ and circumferential stress $\sigma_\theta$ acting on the fourth portion $k_4$ balance. It is clear from the calculation results that in Case 2, the internal pressure and external pressure acting on the valve seat body 5 balance.

In contrast, in Case 2, in the valve seat body 105 according to Comparative Example, the radial stress $\sigma_r$ and circumferential stress $\sigma_\theta$ acting on the first portion $k_1$ and the radial stress $\sigma_r$ and circumferential stress $\sigma_\theta$ acting on the second portion $k_2$ do not balance. However, the radial stress $\sigma_r$ and circumferential stress $\sigma_\theta$ acting on the third portion $k_3$ and the radial stress $\sigma_r$ and circumferential stress $\sigma_\theta$ acting on the fourth portion $k_4$ balance. It is clear from the calculation results that in Case 2, an imbalance between the internal pressure and external pressure acting on the $Z_1$ side of the second seal portion $S_2$ of the valve seat body 105 has occurred.

As is clear from the results of Numerical Calculation 1, in the valve seat body 5 according to the present invention, the internal pressure and the external pressure balance over a region extending in the axis line direction Z in the valve-closed state. With this, the stress having the magnitude by which the valve seat body 5 deforms or breaks does not act on the valve seat body, and the valve seat body 5 is prevented from deforming or breaking. As above, the pressure resistance of the valve seat body 5 is improved by the shape of the valve seat body 5 without increasing the thickness or using the higher-strength material. From the opposite point of view, if the valve seat body 5 according to the present invention and the valve seat body 105 according to Comparative Example need to resist the same fluid pressure, the valve seat body 5 according to the present invention can be made of a material lower in strength than a material of the valve seat body 105 according to Comparative Example or can be made thinner than the valve seat body 105 according to Comparative Example.

Numerical Calculation 2

In Numerical Calculation 1, the axis-line-direction-Z positions of the first and second seal portions $S_1$ and $S_2$ of the valve seat body 5 according to the present invention overlap each other. However, if the shape of the valve seat body 5 is limited, the axis-line-direction-Z positions of the first and second seal portions $S_1$ and $S_2$ may have to differ from each other. Here, in Numerical Calculation 2, the stress calculation was performed regarding the valve seat body 5 in which the axis-line-direction-Z positions of the first and second seal portions $S_1$ and $S_2$ differ from each other. In the numerical calculation model of the valve seat body 5 shown in FIG. 8, the axis-line-direction-Z position of the first seal portion $S_1$ is located on the $Z_2$ side of the axis-line-direction-Z position of the second seal portion $S_2$. The axis-line-direction-Z position of the first seal portion $S_1$ and the axis-line-direction-Z position of the second seal portion $S_2$ are close to each other, and the second seal portion $S_2$ is located between the axis-line-direction-Z position of the first seal portion $S_1$ and the axis-line-direction-Z position of a high-pressure-side (herein, $Z_1$-side) end portion of the valve seat body 5. Here, a region between the second seal portion $S_2$ and first seal portion $S_1$ of the valve seat body 5 in the axis line direction Z is referred to as an "internal-external pressure imbalance region $\Delta L$". In the internal-external pressure imbalance region $\Delta L$ of the valve seat body 5 of the valve device 20 in the valve-closed state, the primary pressure $P_1$ acts on the inner peripheral surface, and the secondary pressure $P_2$ acts on the outer peripheral surface. When the primary pressure $P_1$ is higher than the secondary pressure $P_2$, the region $\Delta L$ becomes an internal pressure load state. When the primary pressure $P_1$ is lower than the secondary pressure $P_2$, the region $\Delta L$ becomes an external pressure load state.

Figure 8:
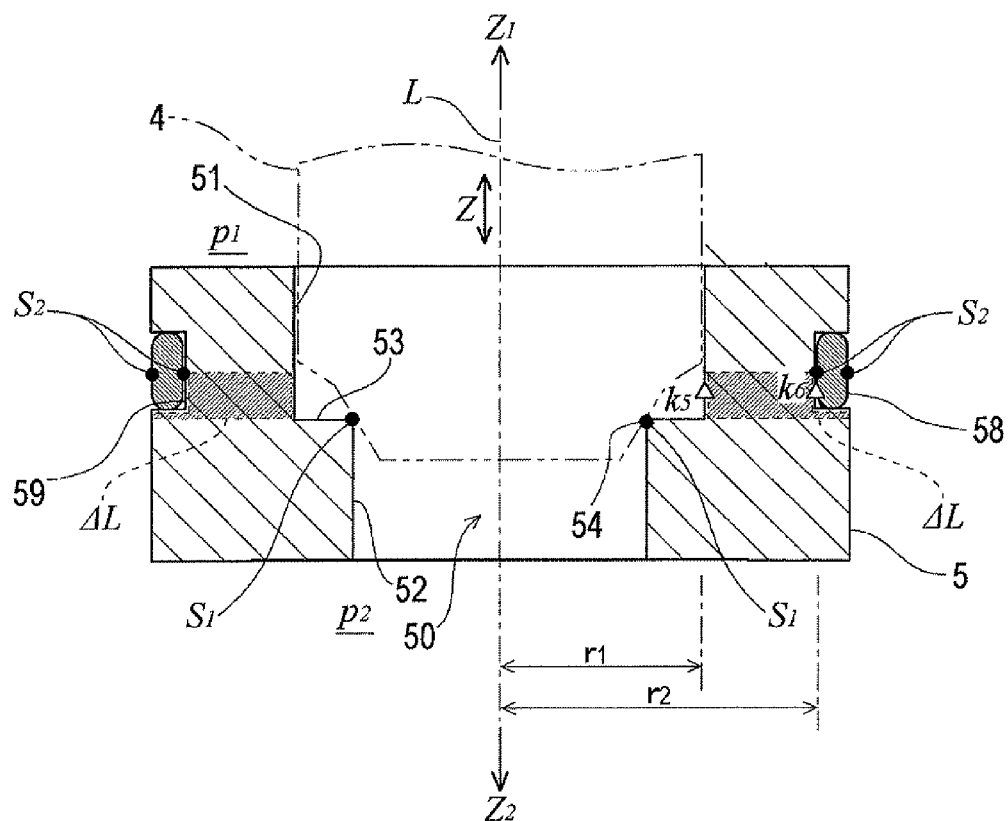
FIG. 8 is a cross-sectional view showing a numerical calculation model of Modification Example of the valve seat body according to the present invention.

In Numerical Calculation 2, the magnitudes of the stresses applied to the valve seat body 5 each of when the internal-external pressure imbalance region $\Delta L$ of the valve seat body 5 is in the internal pressure load state and when it is in the external pressure load state were calculated. As shown in FIG. 8, the numerical calculation model of the valve seat body 5 is a thick cylindrical body having two inner diameters that are large and small inner diameters. The inner radius of the large-diameter portion 51 is $r_1$. The smallest radius of the sealing member 58 is $r_2$, and $r_2$ is equal to $2 \times r_1$. The second seal portion $S_2$ of the numerical calculation model of the valve seat body 5 is located on the $Z_1$ side of the first seal portion $S_1$. The calculation target portions are a fifth portion k5 located on the inner peripheral surface of the internal-external pressure imbalance region ΔL sandwiched between the first seal portion $S_1$ and the second seal portion $S_2$ and a sixth portion k6 located on the outer peripheral surface of the internal-external pressure imbalance region ΔL. Regarding each of the calculation target portions, the radial stress $\sigma_r$, the circumferential stress $\sigma_\theta$, and the maximum principal shear stress τ in each of a case where the internal-external pressure imbalance region ΔL is in the internal pressure load state (the primary pressure $P_1$ is $p_1$, and the secondary pressure $P_2$ is 0) and a case where the internal-external pressure imbalance region ΔL is in the external pressure load state (the primary pressure $P_1$ is 0, and the secondary pressure $P_2$ is $p_2$). In the calculations of the magnitudes of the stresses, as with Numerical Calculation 1 described above, the valve seat body 5 was regarded as a thick cylinder in which the radius of the inner periphery was $r_1$ and the radius of the outer periphery was $r_2$ as shown in FIG. 7, and Formulas 1 to 3 were utilized. Table 2 below shows the calculation results of Numerical Calculation 2.

TABLE 2

| | Stresses Acting on Region ΔL of Valve Seat Body | |
| --- | --- | --- |
| Position | Internal Pressure Load (primary pressure = $p_1$, secondary pressure = 0) | External Pressure Load (primary pressure = 0, secondary pressure = $p_2$) |
| Fifth Portion | $\sigma_r = -p_1$ | $\sigma_r = 0$ |
| | $\sigma_\theta = 1.67 p_1$ | $\sigma_\theta = -2.67 p_2$ |
| | $\tau = 1.33 p_1$ | $\tau = -1.33 p_2$ |
| Sixth Portion | $\sigma_r = 0$ | $\sigma_r = -p_2$ |
| | $\sigma_\theta = 0.67 p_1$ | $\sigma_\theta = -1.67 p_2$ |
| | $\tau = 0.33 p_1$ | $\tau = -0.33 p_2$ |

In the above calculation results, if the primary pressure $P_1$ at the time of the internal pressure load state and the secondary pressure $P_2$ at the time of the external pressure load state are equal to each other, a larger compressive stress acts on the internal-external pressure imbalance region ΔL at the time of the external pressure load state. Therefore, in the case of significantly changing the axis-line-direction-Z position of the first or second seal portion $S_1$ or $S_2$ to the $Z_1$ side or the $Z_2$ side, the internal pressure needs to be higher than the external pressure at a portion where the imbalance of the internal pressure and external pressure acting on the valve seat body 5 in the valve-closed state occurs. In order that the internal-external pressure imbalance region ΔL of the valve seat body 5 in the valve-closed state becomes the internal pressure load state, the axis-line-direction-Z position of the second seal portion $S_2$ may be located on the high-pressure side (primary-pressure side) of the axis-line-direction-Z position of the first seal portion $S_1$. It is preferable that the axis-line-direction-Z position of the first seal portion $S_1$ and the axis-line-direction-Z position of the second seal portion $S_2$ be close to each other. The amount of displacement of each of the axis-line-direction-Z positions of the first and second seal portions $S_1$ and $S_2$ is suitably determined depending on the maximum fluid pressure which may be applied to the valve seat body 5, a constituent material of the valve seat body 5, and the like such that the valve seat body 5 does not deform or break by the difference between the internal pressure and external pressure acting on the internal-external pressure imbalance region ΔL of the valve seat body 5. Even in the case of the external pressure load state, if the internal-external pressure imbalance region ΔL is set to be adequately small in consideration of the constituent material of the valve seat body 5, the valve seat body 5 can obtain adequate strength for resisting stress generated by the difference between the internal pressure and external pressure acting on the valve seat body 5.

Embodiment 1

Figure 9:
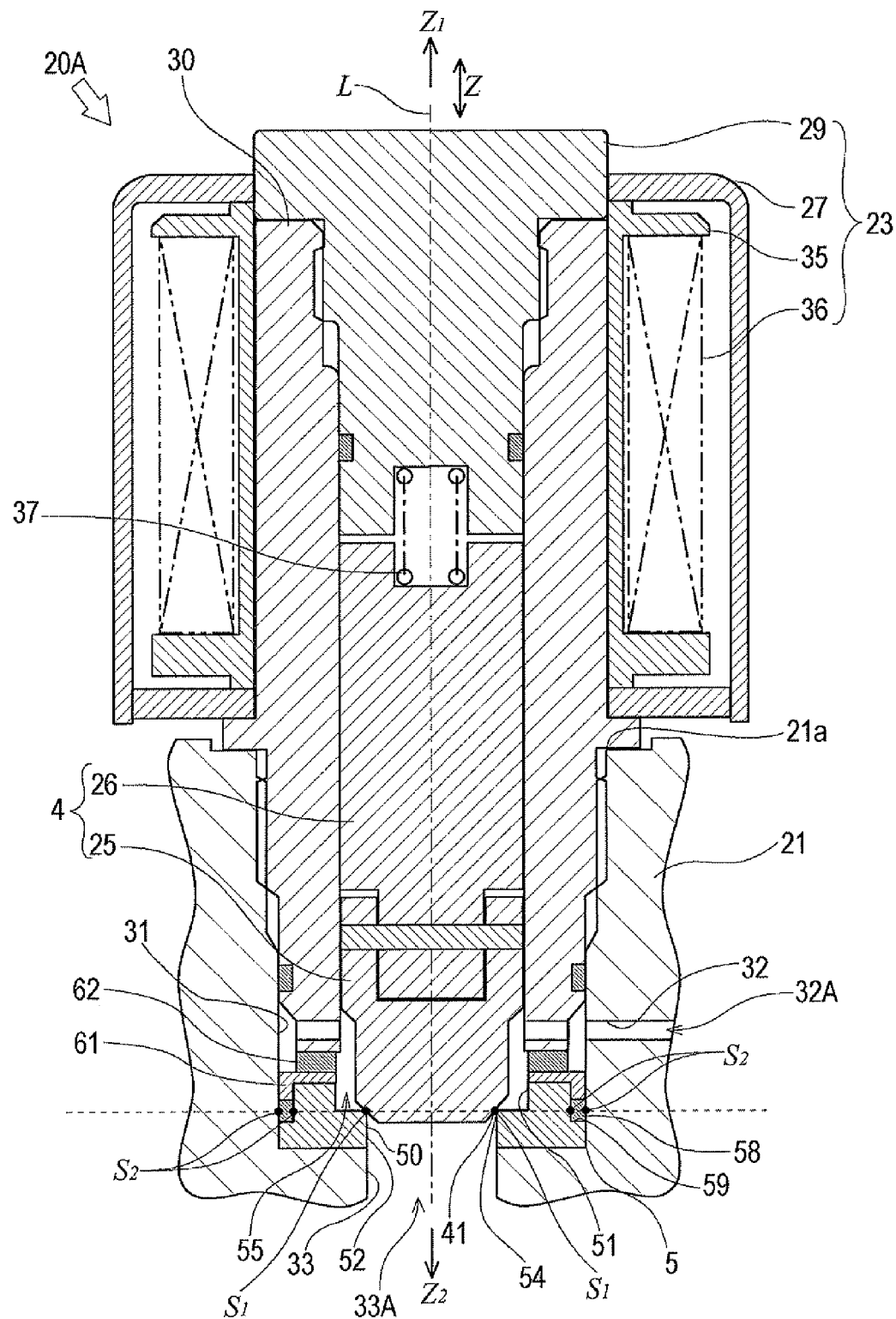
FIG. 9 is a cross-sectional view parallel to a reference axis line of the valve device according to Embodiment 1.

Here, preferred Embodiment 1 of the valve device 20 according to the present invention will be explained in reference to FIG. 9. FIG. 9 is a cross-sectional view parallel to the reference axis line of the valve device according to Embodiment 1. A valve device 20A according to Embodiment 1 is a solenoid on-off valve provided on a passage of a fluid flowing from a supply side to a discharge side and configured to control discharging of a primary-side fluid to a secondary side, the fluid being supplied from the supply side.

The valve device 20A includes a housing 21, the valve body 4, an electromagnetic drive mechanism 23, and the valve seat body 5. The valve device 20A has the reference axis line L. The housing 21, the valve body 4, the electromagnetic drive mechanism 23, and the valve seat body 5 are provided such that each of axis lines thereof coincides with the reference axis line L. Hereinafter, an upper side on the paper of FIG. 9 in the axis line direction Z along the reference axis line L is referred to as a "$Z_1$ direction" or a "$Z_1$ side", and a lower side on the paper of FIG. 9 in the axis line direction Z along the reference axis line L is referred to as a "$Z_2$ direction" or a "$Z_2$ side".

The valve chest 31, the primary passage 32, and the secondary passage 33 are formed on the housing 21. The valve chest 31 is a columnar space formed along the reference axis line L and includes an opening 21a that is open in the $Z_1$ direction. The valve body 4 is inserted through the opening 21a into the valve chest 31. A downstream end of the primary passage 32 is connected to the valve chest 31. The primary passage 32 is formed to extend in a direction intersecting with the reference axis line L. An upstream opening of the primary passage 32 is a primary port 32A and communicates with the supply side. An upstream end of the secondary passage 33 is connected to a $Z_2$-side end surface of the valve chest 31. The secondary passage 33 is formed to extend along the reference axis line L, and a pore diameter thereof is smaller than a pore diameter of the valve chest 31. A downstream opening of the secondary passage 33 is a secondary port 33A and communicates with the discharge side. The primary passage 32, the valve chest 31, and the secondary passage 33 configured as above constitute a valve passage connecting the primary port 32A and the secondary port 33A.

The valve seat body 5 is made of the engineering plastic and is formed as one piece having a thick cylindrical shape whose center line corresponds to the reference axis line L. The valve seat body 5 is provided in the valve chest 31 such that a $Z_2$-side end surface of the valve seat body 5 contacts the $Z_2$-side end surface of the valve chest 31 and an outer peripheral surface of the valve seat body 5 contacts an inner peripheral surface of the valve chest 31. The valve seat body 5 has an outer diameter substantially equal to an inner diameter of the valve chest 31. The seal groove 59 as the sealing member provided portion is formed on the outer peripheral surface of the valve seat body 5. The seal groove 59 extends in the circumferential direction on the outer peripheral surface of the valve seat body 5. The seal groove 59 is formed as a step portion by cutting out a $Z_1$ side portion of the outer peripheral surface of the valve seat body 5 up to an axis-line-direction-Z intermediate portion of the valve seat body 5. The sealing member 58 is provided at the seal groove 59 and seals a portion between the outer peripheral surface of the valve seat body 5 and the inner peripheral surface of the valve chest 31. The portion between the inner periphery of the valve chest 31 and the outer periphery of the valve seat body 5, which is sealed by the sealing member 58, is referred to as the "second seal portion $S_2$".

The $Z_1$-side large-diameter portion 51 and the $Z_2$-side small-diameter portion 52 are formed continuously in the axis line direction Z at the inner periphery of the thick cylinder of the valve seat body 5. The inside of the large-diameter portion 51 of the valve seat body 5 constitutes a part of the valve body chest 55 in which the valve body 4 is accommodated. The inside of the large-diameter portion 51 communicates with the primary passage 32 side. The inside of the small-diameter portion 52 of the valve seat body 5 is the communication passage 50 configured to cause the inside of the valve body chest 55 and the secondary passage 33 side to communicate with each other. The valve seat portion 54 is formed at an inner peripheral edge of the stepped surface 53 where the inner diameter changes from the large-diameter portion 51 to the small-diameter portion 52. The axis-line-direction-Z position of the valve seat portion 54 overlaps or is close to the axis-line-direction-Z position of the seal groove 59.

The valve body 4 is a columnar body extending in the axis line direction Z and is inserted into the valve chest 31 so as to be displaceable in the axis line direction Z. The valve body 4 decreases in diameter in the axis line direction Z in the vicinity of a portion where the valve chest 31 and the primary passage 32 are connected to each other. The valve body 4 moves into the large-diameter portion 51 of the valve seat body 5. The valve body 4 includes the valve portion 41 which is seated on the valve seat portion 54 of the valve seat body 5. The valve body 4 can move between the valve-closed position where the valve portion 41 is seated on the valve seat portion 54 to close the valve passage and the valve-open position where the valve portion 41 separates from the valve seat portion 54 to open the valve passage.

The valve body 4 is constituted by a valve body portion 25 at which the valve portion 41 is provided and a movable core portion 26 joined to a $Z_1$ side portion of the valve body portion 25. The valve body portion 25 is made of a non-magnetic material, such as non-magnetic stainless steel. The movable core portion 26 is made of a magnetic material, such as electromagnetic stainless steel having excellent corrosion resistance.

The valve body 4 configured as above is inserted into a guide member 30 having a cylindrical shape. The guide member 30 is threadedly engaged with the inside of the valve chest 31 so as not to be rotatable about the reference axis line L relative to the housing 21. A $Z_2$-side end surface of the guide member 30 presses a $Z_1$-side end surface of the valve seat body 5 via an elastic member 62 and a pressure equalizing member 61. As above, the position of the valve seat body 5 is maintained in the valve chest 31 by sandwiching the valve seat body 5 between a bottom surface of the valve chest 31 and the guide member 30. The guide member 30 projects from the opening 21a of the housing 21 in the $Z_1$ direction, and the electromagnetic drive mechanism 23 is provided to surround this projecting portion of the guide member 30.

The electromagnetic drive mechanism 23 includes: a bobbin 35 configured to externally fit the guide member 30; a coil 36 configured to wind around the bobbin 35; a solenoid casing 27 configured to cover the bobbin 35 and the coil 36 from an outer periphery side; and a fixed magnetic pole 29 made of ferromagnet. The movable core portion 26 of the valve body 4 is located inside the coil 36. The fixed magnetic pole 29 is inserted into the guide member 30 from the $Z_1$ side, and a $Z_2$-side end surface of the fixed magnetic pole 29 faces a $Z_1$-side end surface of the valve body 4. The fixed magnetic pole 29 and the movable core portion 26 facing each other are provided with a space therebetween, and a compression coil spring 37 is provided therebetween. The compression coil spring 37 presses the movable core portion 26 in the $Z_2$ direction. With this, the valve portion 41 located at a tip end portion of the valve body portion 25 is pressed against the valve seat portion 54 of the valve seat body 5.

In the valve device 20A configured as above, when a current flows through the coil 36, a magnetic force is generated, and the movable core portion 26 and the fixed magnetic pole 29 are magnetized. With this, the movable core portion 26 is magnetically attracted by the fixed magnetic pole 29, and the valve body 4 moves in the $Z_1$ direction while being guided by the guide member 30. Then, the valve body portion 25 separates from the valve seat portion 54, and the valve passage opens. The valve body 4 continuously moves in the $Z_1$ direction up to an open position where the $Z_1$-side end surface of the valve body 4 contacts the fixed magnetic pole 29. When the current flowing through the coil 36 is stopped, the magnetic force acting on the fixed magnetic pole 29 and the movable core portion 26 disappears, and the valve body 4 is pressed toward the valve seat portion 54 by the biasing force of the compression coil spring 37. With this, the valve body 4 moves in the $Z_2$ direction, and the valve portion 41 is seated on the valve seat portion 54 to close the valve passage. A portion between the valve seat body 5 and the valve body 4, which is sealed by the valve portion 41 seated on the valve seat portion 54 when the valve body 4 is at the valve-closed position, is referred to as the "first seal portion $S_1$".

In the valve device 20A in the valve-closed state, the primary pressure (fluid pressure on the primary port 32A side) acts on a portion of the outer periphery of the valve seat body 5, the portion being located on the $Z_1$ side of the second seal portion $S_2$, and the secondary pressure (fluid pressure on the secondary port 33A) acts on a portion of the outer periphery of the valve seat body 5, the portion being located on the $Z_2$ side of the second seal portion $S_2$. In addition, the primary pressure acts on the large-diameter portion 51 of the inner periphery of the valve seat body 5 in the valve-closed state, the large-diameter portion 51 being located on the $Z_1$ side of the first seal portion $S_1$, and the secondary pressure acts on the small-diameter portion 52 of the inner periphery of the valve seat body 5 in the valve-closed state, the small-diameter portion 52 being located on the $Z_2$ side of the first seal portion $S_1$. In the valve device 20A in the valve-closed state, the axis-line-direction-Z position of the first seal portion $S_1$ and the axis-line-direction-Z position of the second seal portion $S_2$ overlap each other or are close to each other. Therefore, the internal pressure and external pressure acting on the valve seat body 5 balance over a region extending in the axis line direction Z. As a result, stress by which the valve seat body 5 deforms or breaks does not act on the valve seat body 5, or even if stress acts on the valve seat body 5, the stress does not have the magnitude by which the valve seat body 5 deforms or breaks.

In Embodiment 1 described above, the valve device 20A is a solenoid valve configured to move the valve body 4 by an electromagnetic force. However, the valve device 20A is not limited to the solenoid valve. For example, the valve device 20A may be an electric operated valve driven by a motor. Or, in the above embodiment, the valve device 20A is a solenoid on-off valve, but the valve device according to the present invention is not limited to the solenoid on-off valve. For example, the valve device according to the present invention is applicable to a fluid-controlled valve different from the solenoid on-off valve. Further, in the above embodiment, the valve body 4 is provided on the supply side (the primary port 32A side) of the valve seat body 5 in the valve device 20A. However, the valve body 4 may be provided on the discharge side (the secondary port 33A side) of the valve seat body 5. Furthermore, in the above embodiment, the supply side (the primary port 32A side) and the discharge side (the secondary port 33A side) may be reversed.

Embodiment 2

Figure 10:
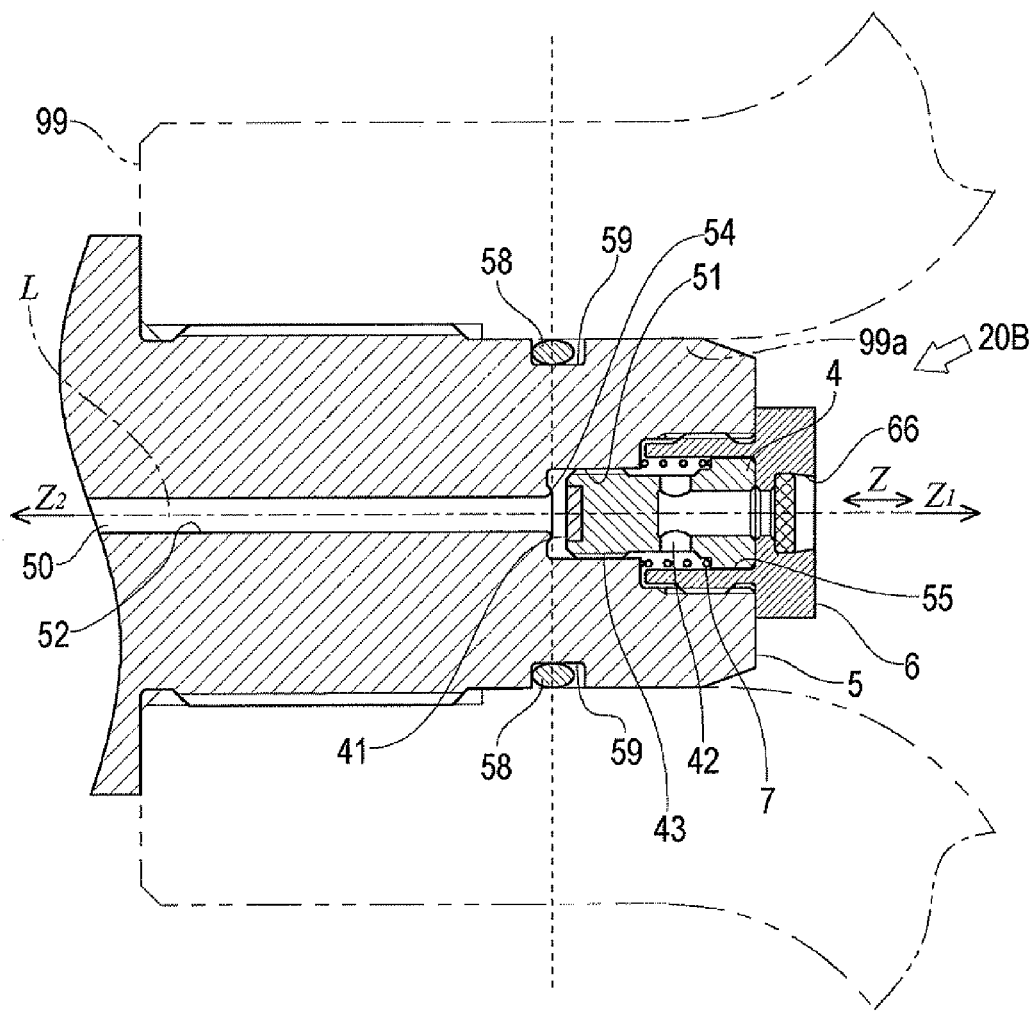
FIG. 10 is a cross-sectional view parallel to the reference axis line of the valve device (valve-open state) according to Embodiment 2.
Figure 11:
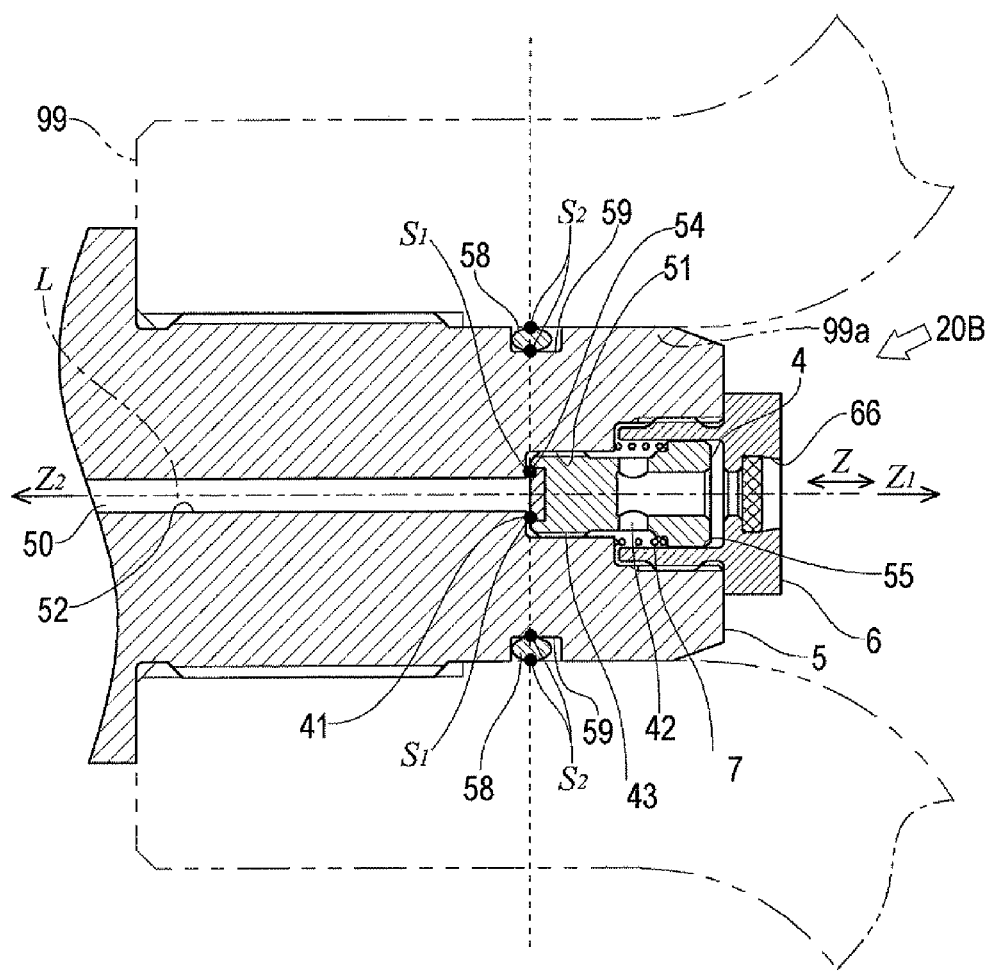
FIG. 11 is a cross-sectional view parallel to the reference axis line of the valve device (valve-closed state) shown in FIG. 10.

Next, preferred Embodiment 2 of the valve device 20 according to the present invention will be explained in reference to FIGS. 10 and 11. FIG. 10 is a cross-sectional view parallel to the reference axis line of the valve device (valve-open state) according to Embodiment 2. FIG. 11 is a cross-sectional view parallel to the reference axis line of the valve device (valve-closed state) shown in FIG. 10. Although the valve device 20A according to Embodiment 1 is applied to the solenoid on-off valve, a valve device 20B according to Embodiment 2 is applied to an excess flow check valve. The excess flow check valve is a flow control valve configured to normally open to allow a fluid to flow out from the primary side to the secondary side whereas when the fluid flows at a predetermined flow rate or higher, close to block the outflow of the fluid. For example, the valve device 20B is provided on a gas passage through which a gas stored in a gas bomb in a pressurized state is supplied to a gas using device, and the valve device 20B is inserted into an opening 99a of a gas bomb 99. One example of the gas using device is a fuel cell. In this case, a hydrogen gas of extreme pressure (about 70 MPa at most) is stored in the gas bomb.

The valve device 20B includes the valve body 4, the valve seat body 5, a lid body 6, and a biasing body 7. The valve device 20B has the reference axis line L. The valve body 4, the valve seat body 5, the lid body 6, and the biasing body 7 are provided such that each of axis lines thereof coincides with the reference axis line L. Hereinafter, a right side on the paper of FIG. 10 in the axis line direction Z along the reference axis line L is referred to as the "$Z_1$ direction" or the "$Z_1$ side", and a left side on the paper of FIG. 10 in the axis line direction Z along the reference axis line L is referred to as the "$Z_2$ direction" or the "$Z_2$ side". A fluid flows from the $Z_1$ side to the $Z_2$ side. The $Z_1$ side is the primary side (supply side), and the $Z_2$ side is the secondary side (discharge side).

The valve seat body 5 is a metal screw-shaped member and has a thick cylindrical shape whose center line corresponds to the reference axis line L. The valve seat body 5 is fitted in the opening 99a of the gas bomb 99 in the $Z_1$ direction. The seal groove 59 as the sealing member provided portion is formed on the outer periphery of the valve seat body 5. The seal groove 59 is a circular recess extending in the circumferential direction on the outer periphery of the valve seat body 5. The sealing member 58 is provided at the seal groove 59 and stops the flow of the gas between the inner periphery of the housing 8 and the outer periphery of the valve seat body 5. A portion between the inner periphery of the opening 99a and the outer periphery of the valve seat body 5, which is sealed by the sealing member 58 as above, is referred to as a "second seal portion $S_2$". The sealing member 58 according to the present embodiment is an O-ring.

The $Z_1$-side large-diameter portion 51 and the $Z_2$-side small-diameter portion 52 are formed at the inner peripheral surface of the thick cylinder of the valve seat body 5. The large-diameter portion 51 and the small-diameter portion 52 are connected to each other in the axis line direction Z. The valve seat portion 54 on which the valve portion 41 of the valve body 4 is seated is formed on the stepped surface where the inner diameter changes from the large-diameter portion 51 to the small-diameter portion 52. The axis-line-direction-Z position of the valve seat portion 54 overlaps the axis-line-direction-Z position of the seal groove 59. The inside of the large-diameter portion 51 of the valve seat body 5 constitutes a part of the valve body chest 55 in which the valve body 4 is accommodated. The inside of the small-diameter portion 52 of the valve seat body 5 is the communication passage 50 connecting the valve body chest 55 and the secondary side.

The lid body 6 is fitted in the $Z_1$-side end surface of the valve seat body 5 in the $Z_2$ direction. The lid body 6 is fitted so as to plug the large-diameter portion 51 that is open on the $Z_1$-side end surface of the valve seat body 5. The valve body chest 55 in which the valve body 4 is accommodated is formed in an internal space formed by the valve seat body 5 and the lid body 6. An inflow opening 66 configured to allow the fluid to flow from the primary side into the valve body chest 55 is formed on a portion, where the reference axis line L extends, of the lid body 6.

The valve body 4 is accommodated in the valve body chest 55 so as to be slidable in the axis line direction Z, the valve body chest 55 being formed by the valve seat body 5 and the lid body 6. The valve body 4 is a columnar body whose axial direction corresponds to the axis line direction Z, and the valve portion 41 configured to be seated on the valve seat portion 54 of the valve seat body 5 is formed on the $Z_2$-side end surface of the valve body 4. An internal passage 42 connected to the inflow opening 66 of the lid body 6 is formed in the valve body 4, and the fluid is caused to flow from the internal passage 42 to the valve body chest 55. An external passage 43 (groove) through which the fluid flows from the valve body chest 55 toward the communication passage 50 is formed on the outer periphery of the valve body 4. The valve body 4 is biased by the biasing body 7 in the $Z_1$ direction. To be specific, the valve body 4 is biased by the biasing body 7 that is a biasing member so as to open. In the present embodiment, used as the biasing body 7 is a compression coil spring.

In a case where the fluid flows from the inflow opening 66 of the lid body 6 into the valve device 20B configured as above at lower than a predetermined flow rate, the pressure loss generated when the fluid flows through the external passage 43 of the valve body 4 is small. Therefore, the valve body 4 provided in the valve body chest 55 is not seated on the valve seat portion 54 by the biasing force of the biasing body 7. To be specific, the valve-open state (nonoperating state) in which the inflow opening 66 and the communication passage 50 communicate with each other is realized. In the valve-open state, the fluid from the inflow opening 66 flows through the internal passage 42 of the valve body 4 into the valve body chest 55, flows through the external passage 43 of the valve body 4 into the communication passage 50, and flows through the communication passage 50 to the outside. In contrast, in a case where the fluid flows from the inflow opening 66 into the valve device 20B at the predetermined flow rate or higher, the pressure loss generated when the fluid flows through the external passage 43 of the valve body 4 is large. Therefore, the valve body 4 provided in the valve body chest 55 moves in the $Z_2$ direction against the biasing force of the biasing body 7, and thus, the valve portion 41 is seated on the valve seat portion 54. With this, the inflow opening 66 and the communication passage 50 do not communicate with each other, to be specific, the valve-closed state (operating state) is realized. A portion between the valve seat body 5 and the valve body 4, which is sealed by the valve portion 41 seated on the valve seat portion 54 when the valve device 20B is in the valve-closed state, is referred to as the "first seal portion $S_1$".

When the valve device 20B is in the valve-closed state, the pressure (secondary pressure) on the secondary side decreases to about atmospheric pressure whereas the pressure (primary pressure) on the primary side is maintained at high pressure. When the valve device 20B is in the valve-closed state, the primary pressure acts on the large-diameter portion 51 of the inner periphery of the valve seat body 5, the large-diameter portion 51 being located on the $Z_1$ side of the first seal portion $S_1$, and the secondary pressure acts on the small-diameter portion 52 of the inner periphery of the valve seat body 5, the small-diameter portion 52 being located on the $Z_2$ side of the first seal portion $S_1$. In addition, the primary pressure acts on a portion of the outer periphery of the valve seat body 5, the portion being located on the $Z_1$ side of the second seal portion $S_2$, and the atmospheric pressure acts on a portion of the outer periphery of the valve seat body 5, the portion being located on the $Z_2$ side of the second seal portion $S_2$. In the valve device 20B, the axis-line-direction-Z position of the first seal portion $S_1$ and the axis-line-direction-Z position of the second seal portion $S_2$ overlap each other or are close to each other. Therefore, in the valve seat body 5 in the valve-closed state, the internal pressure and the external pressure balance over a region extending in the axis line direction Z. As a result, stress having the magnitude by which the valve seat body 5 deforms or breaks does not act on the valve seat body 5, and the valve seat body 5 is prevented from deforming and breaking. As above, the pressure resistance of the valve seat body 5 can be improved by the shape of the valve seat body 5 without increasing the thickness or using the higher-strength material. Then, the valve device 20B including the valve seat body 5 having the high pressure resistance can be provided at the flow of the higher-pressure fluid than before.

Figure 12:
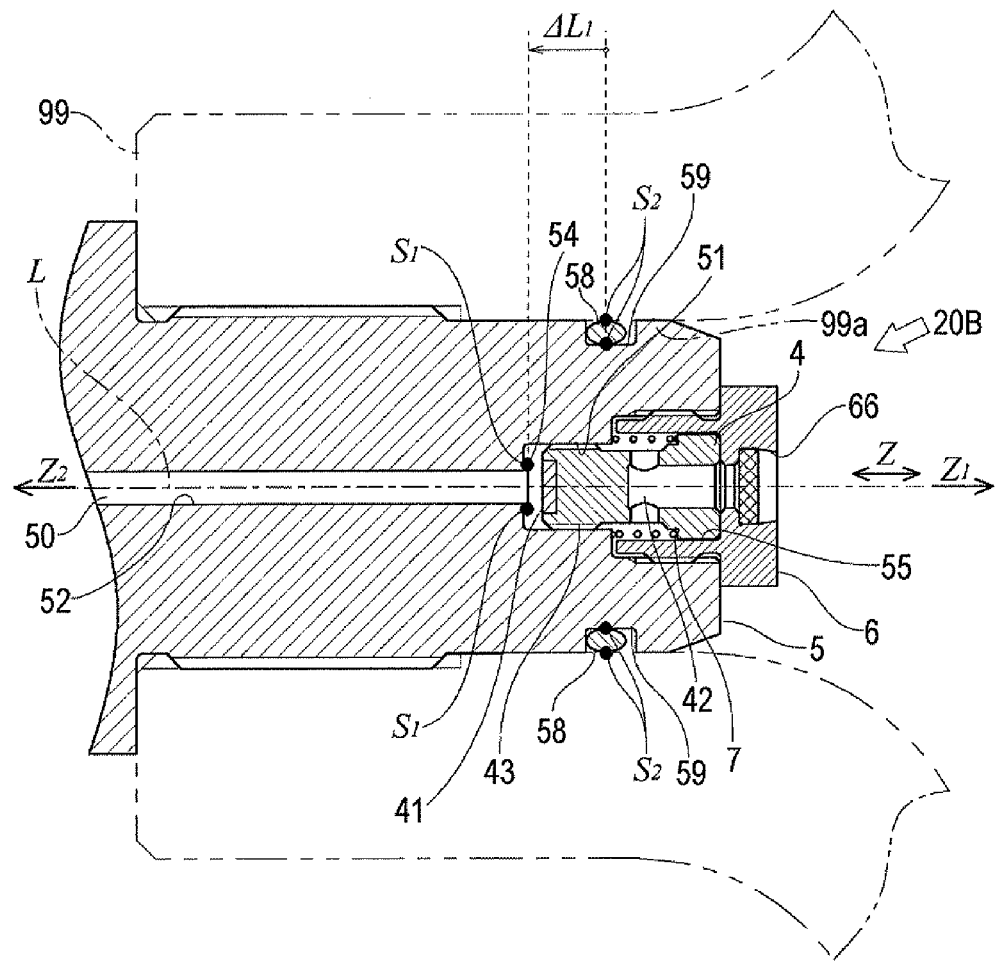
FIG. 12 is a diagram showing Modification Example of the valve device shown in FIG. 10.

In the above embodiment, the positions of the first seal portion $S_1$ and the second seal portion $S_2$ overlap each other in the axis line direction Z. However, the valve seat body 5 may have the high pressure resistance even when the axis-line-direction-Z positions of the first seal portion $S_1$ and the second seal portion $S_2$ differ from each other. FIG. 12 is a diagram showing Modification Example of the valve device shown in FIG. 10. For example, in the valve device 20B shown in FIG. 12, the axis-line-direction-Z position of the second seal portion $S_2$ is located on the $Z_1$ side (high-pressure side) of the axis-line-direction-Z position of the first seal portion $S_1$. Therefore, in the valve device 20B in the valve-closed state, an internal-external pressure imbalance region $\Delta L_1$ is formed between the first seal portion $S_1$ and second seal portion $S_2$ of the valve seat body 5 in the axis line direction Z. In the internal-external pressure imbalance region $\Delta L_1$, the primary pressure acts on the inner peripheral surface of the valve seat body 5, and the secondary pressure acts on the outer peripheral surface of the valve seat body 5. Since the primary pressure is significantly higher than the secondary pressure, the internal-external pressure imbalance region $\Delta L_1$ becomes the internal pressure load state. The internal-external pressure imbalance region $\Delta L_1$ exists in the valve seat body 5. However, the internal-external pressure imbalance region $\Delta L_1$ in the valve-closed state is in the internal pressure load state, there is a difference between the inner diameter and outer diameter of the valve seat body 5, and the valve seat body 5 is surrounded by a member having high stiffness. Therefore, even if the difference between the internal pressure and external pressure acting on the valve seat body 5 becomes significantly large, stress having the magnitude by which the valve seat body 5 deforms or breaks does not act on the valve seat body 5, and the valve seat body 5 can be prevented from deforming and breaking.

Embodiment 3

Figure 13:
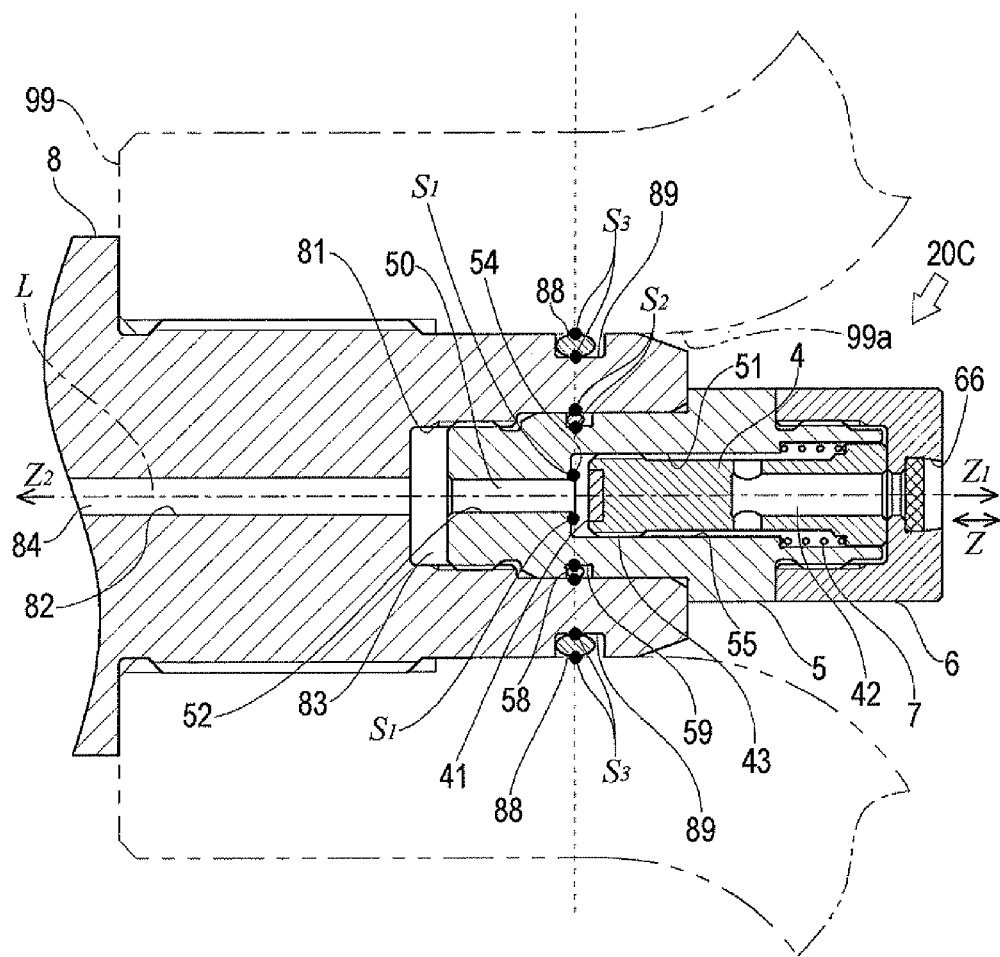
FIG. 13 is a cross-sectional view parallel to the reference axis line of the valve device according to Embodiment 3.

Next, preferred Embodiment 3 of the valve device 20 according to the present invention will be explained in reference to FIG. 13. FIG. 13 is a cross-sectional view parallel to the reference axis line of the valve device according to Embodiment 3. As with the valve device 20B according to Embodiment 2, the valve device 20C according to Embodiment 3 is applied to the excess flow check valve. For example, the valve device 20C is provided on a gas passage through which a gas stored in a gas bomb in a pressurized state is supplied to a gas using device and is inserted into the opening 99a of the gas bomb 99. One example of the gas using device is a fuel cell. In this case, a hydrogen gas of extreme pressure (about 70 MPa at most) is stored in the gas bomb.

The valve device 20C includes the valve body 4, the valve seat body 5, the lid body 6, the biasing body 7, and the housing 8. The valve device 20C has the reference axis line L. The valve body 4, the valve seat body 5, the lid body 6, and the biasing body 7 are provided such that each of axis lines thereof coincides with the reference axis line L. Hereinafter, a right side on the paper of FIG. 13 in the axis line direction Z along the reference axis line L is referred to as the "$Z_1$ direction" or the "$Z_1$ side", and a left side on the paper of FIG. 13 in the axis line direction Z along the reference axis line L is referred to as the "$Z_2$ direction" or the "$Z_2$ side". The fluid flows from the $Z_1$ side to the $Z_2$ side. The $Z_1$ side is the primary side (supply side), and the $Z_2$ side is the secondary side (discharge side).

The housing 8 has a thick cylindrical shape whose center line corresponds to the reference axis line L. The housing 8 is fitted in the opening 99a of the gas bomb 99 in the $Z_1$ direction. A seal groove 89 as the sealing member provided portion is formed on the outer periphery of the housing 8. The seal groove 89 is a circular recess extending in the circumferential direction on the outer periphery of the housing 8. A sealing member 88 is provided at the seal groove 89 and stops the flow of the gas between the inner periphery of the opening 99a and the outer periphery of the housing 8. A portion between the inner periphery of the opening 99a and the outer periphery of the housing 8, which is sealed by the sealing member 88 as above, is referred to as a "third seal portion $S_3$". The sealing member 88 according to the present embodiment is an O-ring.

A $Z_1$-side large-diameter portion 81 and a $Z_2$-side small-diameter portion 82 are formed at the inner peripheral surface of the thick cylinder of the housing 8. The large-diameter portion 81 and the small-diameter portion 82 are connected to each other in the axis line direction Z. The inside of the large-diameter portion 81 of the housing 8 is a valve seat chest 83 in which the valve seat body 5 is accommodated. The inside of the small-diameter portion 82 of the housing 8 is a communication passage 84 connecting the valve seat chest 83 and the secondary side.

The valve seat body 5 is a metal screw-shaped member and has a thick cylindrical shape whose center line corresponds to the reference axis line L. The valve seat body 5 is fitted in the large-diameter portion 81 of the housing 8 in the $Z_2$ direction. The seal groove 59 is formed on the outer periphery of the valve seat body 5. The seal groove 59 is a circular recess extending in the circumferential direction on the outer periphery of the valve seat body 5. The axis-line-direction-Z position of the seal groove 59 and the axis-line-direction-Z position of the seal groove 89 of the housing 8 overlap each other or are extremely close to each other. The sealing member 58 is provided at the seal groove 59 and stops the flow of the gas between the inner periphery of the housing 8 and the outer periphery of the valve seat body 5. A portion between the inner periphery of the housing 8 and the outer periphery of the valve seat body 5, which is sealed by the sealing member 58, is referred to as the "second seal portion $S_2$". The sealing member 58 according to the present embodiment is an O-ring.

The $Z_1$-side large-diameter portion 51 and the $Z_2$-side small-diameter portion 52 are formed at the inner peripheral surface of the thick cylinder of the valve seat body 5. The large-diameter portion 51 and the small-diameter portion 52 are connected to each other in the axis line direction Z. The valve seat portion 54 on which the valve portion 41 of the valve body 4 is seated is formed on the stepped surface where the inner diameter changes from the large-diameter portion 51 to the small-diameter portion 52. The axis-line-direction-Z position of the valve seat portion 54 overlaps or is extremely close to each of the axis-line-direction-Z positions of the seal grooves 89 and 59. The inside of the large-diameter portion 51 of the valve seat body 5 constitutes a part of the valve body chest 55 in which the valve body 4 is accommodated. The inside of the small-diameter portion 52 of the valve seat body 5 is the communication passage 50 connecting the valve body chest 55 and the secondary side (the valve seat chest 83).

The lid body 6 is fitted in the $Z_1$-side end surface of the valve seat body 5 in the $Z_2$ direction. The lid body 6 is fitted so as to plug the large-diameter portion 51 that is open on the $Z_1$-side end surface of the valve seat body 5. The valve body chest 55 in which the valve body 4 is accommodated is formed by the valve seat body 5 and the lid body 6. The inflow opening 66 configured to allow the fluid to flow from the primary side into the valve body chest 55 is formed on a portion, where the reference axis line L extends, of the lid body 6.

The valve body 4 is accommodated in the valve body chest 55 so as to be slidable in the axis line direction Z, the valve body chest 55 being formed by the valve seat body 5 and the lid body 6. The valve body 4 is a columnar body whose axial direction corresponds to the axis line direction Z, and the valve portion 41 configured to be seated on the valve seat portion 54 of the valve seat body 5 is formed on the $Z_2$-side end surface of the valve body 4. The internal passage 42 connected to the inflow opening 66 of the lid body 6 is formed in the valve body 4, and the fluid is caused to flow from the internal passage 42 to the valve body chest 55. The external passage 43 (groove) through which the fluid flows from the valve body chest 55 toward the communication passage 50 is formed on the outer periphery of the valve body 4. The valve body 4 is biased by the biasing body 7 in the $Z_1$ direction. To be specific, the valve body 4 is biased by the biasing body 7 that is a biasing member so as to open. In the present embodiment, used as the biasing body 7 is a compression coil spring.

In a case where the fluid flows from the inflow opening 66 of the lid body 6 into the valve device 20C configured as above at lower than a predetermined flow rate, the pressure loss generated when the fluid flows through the external passage 43 of the valve body 4 is small. Therefore, the valve body 4 provided in the valve body chest 55 is not seated on the valve seat portion 54 by the biasing force of the biasing body 7. To be specific, the valve-open state (nonoperating state) in which the inflow opening 66 and the communication passage 84 communicate with each other is realized. In the valve-open state, the fluid from the inflow opening 66 flows through the internal passage 42 of the valve body 4 into the valve body chest 55, flows through the external passage 43 of the valve body 4 into the communication passage 50, flows through the communication passage 50 into the valve seat chest 83, and flows through the communication passage 84 to the outside. In contrast, in a case where the fluid flows from the inflow opening 66 into the valve device 20C at the predetermined flow rate or higher, the pressure loss generated when the fluid flows through the external passage 43 of the valve body 4 is large. Therefore, the valve body 4 provided in the valve body chest 55 moves in the $Z_2$ direction against the biasing force of the biasing body 7, and thus, the valve portion 41 is seated on the valve seat portion 54. With this, the inflow opening 66 and the communication passage 84 do not communicate with each other, to be specific, the valve-closed state (operating state) is realized. A portion between the valve seat body 5 and the valve body 4, which is sealed by the valve portion 41 seated on the valve seat portion 54 when the valve device 20C is in the valve-closed state, is referred to as the "first seal portion $S_1$".

When the valve device 20C is in the valve-closed state, the pressure (secondary pressure) on the secondary side decreases to about atmospheric pressure whereas the pressure (primary pressure) on the primary side is maintained at high pressure. When the valve device 20C is in the valve-closed state, the primary pressure acts on the large-diameter portion 81 of the inner periphery of the housing 8, the large-diameter portion 81 being located on the $Z_1$ side of the second seal portion $S_2$, and the secondary pressure acts on the large-diameter portion 81 and the small-diameter portion 82 which are located on the $Z_2$ side of the second seal portion $S_2$. In addition, the primary pressure acts on a portion of the outer periphery of the housing 8, the portion being located on the $Z_1$ side of the third seal portion $S_3$, and the atmospheric pressure acts on a portion of the outer periphery of the housing 8, the portion being located on the $Z_2$ side of the third seal portion $S_3$. Similarly, the primary pressure acts on the large-diameter portion 51 of the inner periphery of the valve seat body 5, the large-diameter portion 51 being located on the $Z_1$ side of the first seal portion $S_1$, and the secondary pressure acts on the small-diameter portion 52 of the inner periphery of the valve seat body 5, the small-diameter portion 52 being located on the $Z_2$ side of the first seal portion $S_1$. In addition, the primary pressure acts on a portion of the outer periphery of the valve seat body 5, the portion being located on the $Z_1$ side of the second seal portion $S_2$, and the secondary pressure or the atmospheric pressure acts on a portion of the outer periphery of the valve seat body 5, the portion being located on the $Z_2$ side of the second seal portion $S_2$.

In the valve device 20C, the first, second, and third seal portions $S_1$, $S_2$, and $S_3$ are provided so as to overlap each other in the axis line direction Z. Therefore, in the housing 8 and the valve seat body 5 in the valve-closed state, the internal pressure and the external pressure balance over a region extending in the axis line direction Z. As a result, stress having the magnitude by which the housing 8 and the valve seat body 5 deform or break does not act on the housing 8 and the valve seat body 5, and the housing 8 and the valve seat body 5 are prevented from deforming and breaking. As above, the pressure resistance of each of the housing 8 and the valve seat body 5 can be improved by the shape of each of the housing 8 and the valve seat body 5 without increasing the thickness or using the higher-strength material. Then, the valve device 20C including the housing 8 and the valve seat body 5 each having the high pressure resistance can be provided at the flow of the higher-pressure fluid than before.

In the foregoing, the first, second, third seal portions $S_1$, $S_2$, and $S_3$ are provided so as to overlap one another in the axis line direction Z. However, the valve device 20C may have the pressure resistance even when the axis-line-direction-Z positions of the first, second, third seal portions $S_1$, $S_2$, and $S_3$ differ from one another. Hereinafter, Modification Examples 1 and 2 of the valve device 20C according to Embodiment 3 will be explained.

Figure 14:
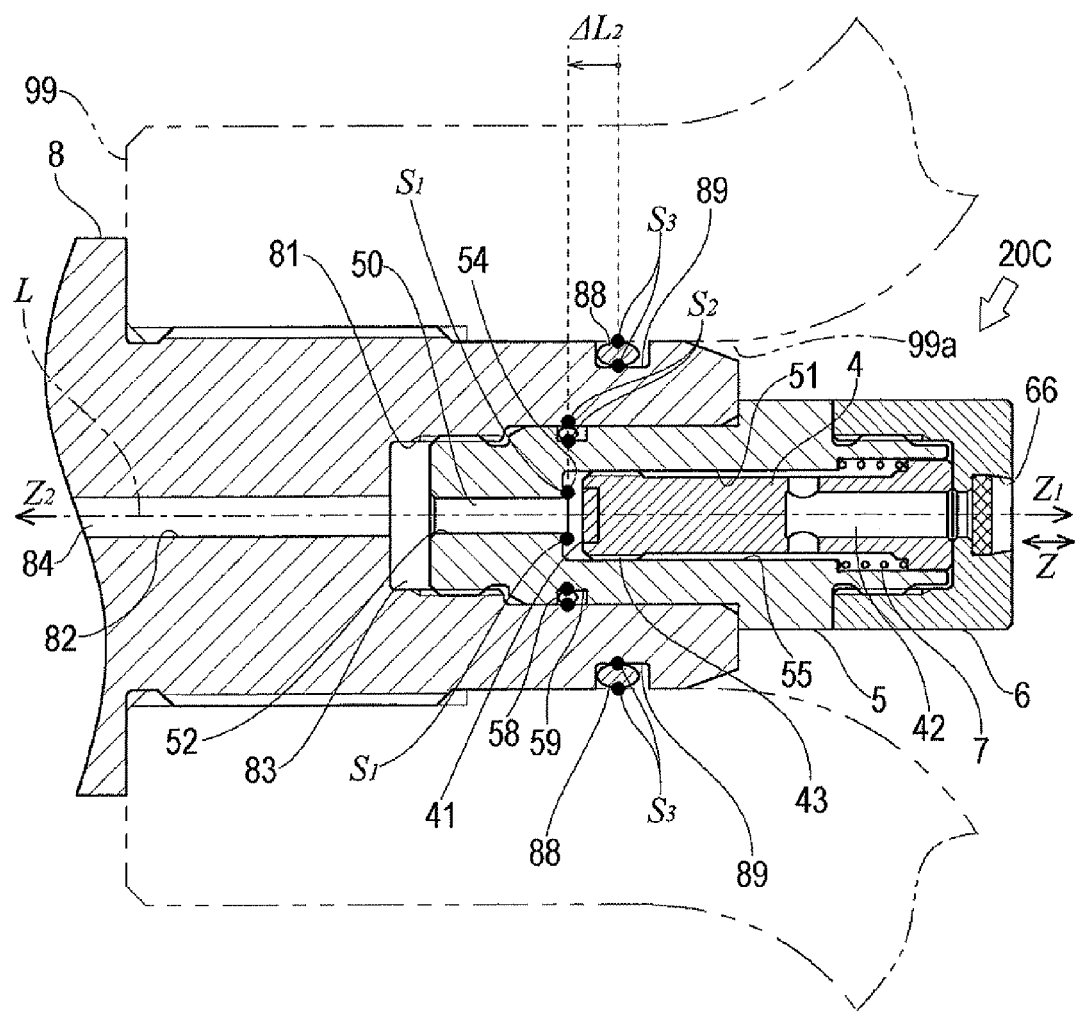
FIG. 14 is a diagram showing Modification Example 1 of the valve device shown in FIG. 13.

FIG. 14 is a diagram showing Modification Example 1 of the valve device shown in FIG. 13. In the valve device 20C shown in FIG. 14, the axis-line-direction-Z positions of the first and second seal portions $S_1$ and $S_2$ overlap each other, but the axis-line-direction-Z position of the third seal portion $S_3$ is located on the $Z_1$ side (high-pressure side) of the axis-line-direction-Z positions of the first and second seal portions $S_1$ and $S_2$. Therefore, in the valve device 20C in the valve-closed state, a region between the third seal portion $S_3$ and second seal portion $S_2$ of the housing 8 in the axis line direction Z is an internal-external pressure imbalance region $\Delta L_2$. In the internal-external pressure imbalance region $\Delta L_2$ of the housing 8, the primary pressure acts on the inner peripheral surface, and the secondary pressure acts on the outer peripheral surface. Since the primary pressure is significantly higher than the secondary pressure, the internal-external pressure imbalance region $\Delta L_2$ becomes the internal pressure load state. As above, the internal-external pressure imbalance region $\Delta L_2$ exists in the housing 8. However, the internal-external pressure imbalance region $\Delta L_2$ in the valve-closed state is in the internal pressure load state, there is a difference between the inner diameter and outer diameter of the housing 8, and the housing 8 is surrounded by a member having high stiffness. Therefore, even if the difference between the internal pressure and external pressure acting on the housing 8 becomes significantly large, stress having the magnitude by which the housing 8 deforms or breaks does not act on the housing 8, and the housing 8 is prevented from deforming and breaking.

Figure 15:
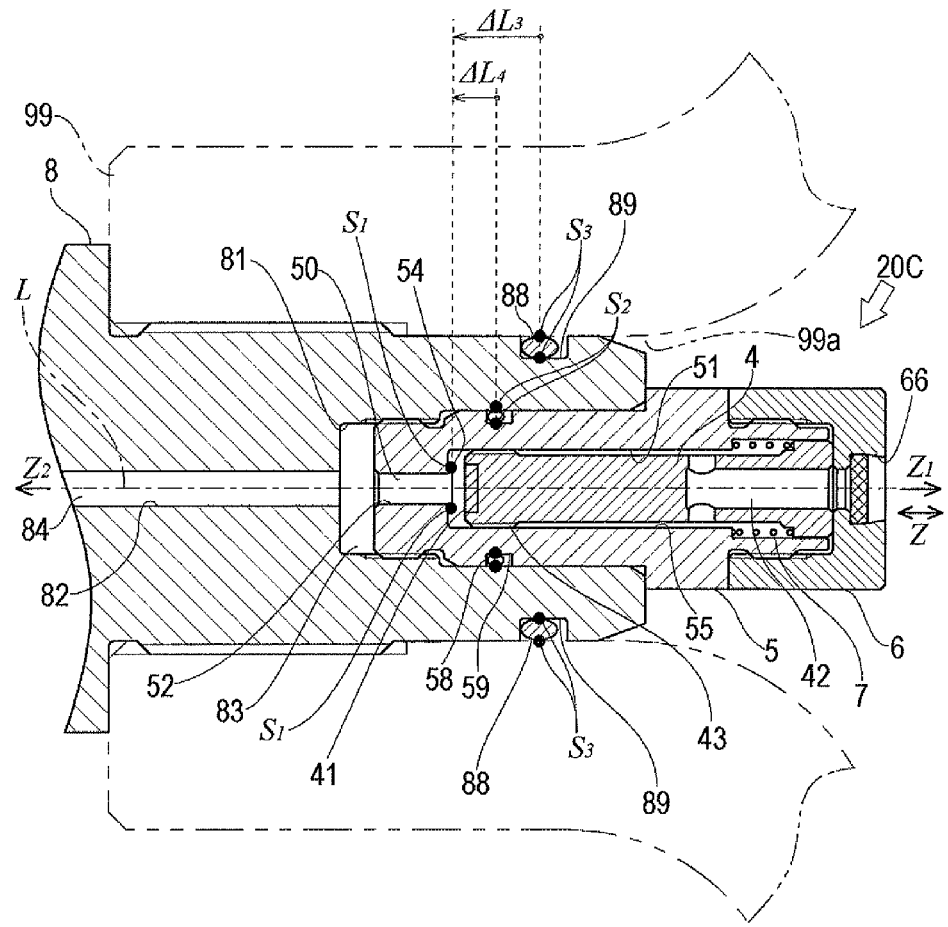
FIG. 15 is a diagram showing Modification Example 2 of the valve device shown in FIG. 13.
Figure 16:
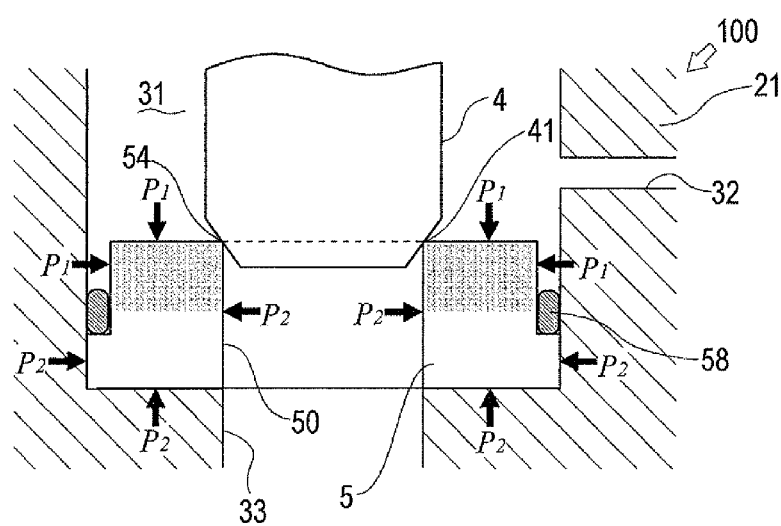
FIG. 16 is a cross-sectional view showing the schematic configuration of a conventional valve device.

FIG. 15 is a diagram showing Modification Example 2 of the valve device shown in FIG. 13. In the valve device 20C shown in FIG. 15, the second seal portion $S_2$ is located on the $Z_2$ side of the third seal portion $S_3$, and the first seal portion is located on the $Z_2$ side of the second seal portion $S_2$. To be specific, the seal portions of the valve device 20C are sequentially provided from the inside to the outside, that is, to the $Z_1$ side (high-pressure side). Therefore, in the valve device 20C in the valve-closed state, a region between the third seal portion $S_3$ and second seal portion $S_2$ of the housing 8 in the axis line direction Z becomes an internal-external pressure imbalance region $\Delta L_3$. In the internal-external pressure imbalance region $\Delta L_3$ of the housing 8, the primary pressure acts on the inner peripheral surface, and the secondary pressure acts on the outer peripheral surface. Similarly, a region between the second seal portion $S_2$ and first seal portion $S_1$ of the valve seat body 5 in the axis line direction Z becomes an internal-external pressure imbalance region $\Delta L_4$. In the internal-external pressure imbalance region $\Delta L_4$ of the valve seat body 5, the primary pressure acts on the inner peripheral surface, and the secondary pressure acts on the outer peripheral surface. Since the primary pressure is significantly higher than the secondary pressure, each of the internal-external pressure imbalance regions $\Delta L_3$ and $\Delta L_4$ becomes the internal pressure load state. As above, the internal-external pressure imbalance regions $\Delta L_3$ and $\Delta L_4$ exist at the valve seat body 5 and the housing 8. However, the internal-external pressure imbalance regions $\Delta L_3$ and $\Delta L_4$ in the valve-closed state are in the internal pressure load states, there is a difference between the inner diameter and outer diameter of each of the valve seat body 5 and the housing 8, and each of the valve seat body 5 and the housing 8 is surrounded by a member having high stiffness. Therefore, even if the difference between the internal pressure and the external pressure acting on each of the valve seat body 5 and the housing 8 becomes significantly large, stress having the magnitude by which the valve seat body 5 and the housing 8 deforms or breaks does not act on the valve seat body 5 and the housing 8, and the valve seat body 5 and the housing 8 are prevented from deforming and breaking.

In the foregoing, preferred embodiments of the present invention are explained. However, the present invention is not limited to the above embodiments. Various design changes may be made within the scope of the claims.

For example, in Embodiment 1 described above, the valve seat body 5 is made of engineering plastic. However, the valve seat body 5 according to Embodiment 1 may be made of a synthetic resin other than the engineering plastic. Even in this case, the valve seat body 5 can resist high fluid pressure by the shape thereof when the valve is in a closed state, the high fluid pressure being higher than the fluid pressure that the conventional the valve seat body 105 can resist. In other words, in a case where the valve seat body 5 and the conventional the valve seat body 105 are used under the same pressure condition, the valve seat body 5 can be made of a resin having lower strength. Thus, both the securing of the airtightness and the cost reduction can be realized.

INDUSTRIAL APPLICABILITY

The present invention is applicable to a valve device including a resin valve seat body configured to seal a high-pressure fluid.

REFERENCE SIGNS LIST $S_1$ first seal portion
$S_2$ second seal portion
$S_3$ third seal portion
4 valve body
41 valve portion
5 valve seat body
6 lid body
7 biasing body
8 housing
20, 20A, 20B, 20C valve device
21 housing
23 electromagnetic drive mechanism
31 valve chest
32 primary passage
33 secondary passage
50 communication passage
51 large-diameter portion
52 small-diameter portion
53 stepped surface
54 valve seat portion
55 valve body chest
58, 88 sealing member
59, 89 seal groove (sealing member provided portion)

The invention claimed is:

1. A valve seat body having a thick cylindrical shape, the valve seat body comprising:
   a valve seat portion on which a valve body is seated;
   a first sealing member providing portion provided on an outer periphery of the valve seat body; and
   a large-diameter portion and a small-diameter portion provided on an inner periphery of the valve seat body, wherein:
      the valve seat portion is provided between the large-diameter portion and the small-diameter portion;
      the large-diameter portion has an inner diameter larger than an outer diameter of the valve body, the valve body being configured to move into the large-diameter portion from an axis line direction;

the small-diameter portion has an inner diameter smaller than the outer diameter of the valve body; and a position of the first sealing member providing portion in the axis line direction is located on a high-pressure side of the position of the valve seat portion in the axis line direction.

2. The valve seat body according to claim 1, wherein the position of the first sealing member providing portion of the valve seat body in the axis line direction is located between the valve seat portion of the valve seat body and an end portion of the valve seat body, the end portion being located on the high-pressure side.

3. A valve device comprising:
a housing; and
the valve seat body according to claim 2, the valve seat body being accommodated in the housing; wherein:
the valve body is provided to be movable in the axis line direction between a closed position where the valve body is seated on the valve seat portion of the valve seat body, and an open position where the valve body separates from the valve seat portion; and
the first sealing member is provided at the first sealing member providing portion of the valve seat body to seal between the housing and the valve seat body.

4. The valve device according to claim 3, wherein:
the housing has a thick cylindrical shape and includes (i) an accommodating portion formed at an inner periphery thereof, the accommodating portion being configured to accommodate the valve seat body, and (ii) a second sealing member providing portion formed on an outer periphery thereof and extending in a circumferential direction; and
a position of the second sealing member providing portion in the axis line direction overlaps the position of the first sealing member providing portion in the axis line direction or is located on the high-pressure side of the position of the first sealing member providing portion in the axis line direction.

5. The valve device according to claim 4, wherein:
a second sealing member is provided at the second sealing member providing portion; and
a height range of the second sealing member in the axis line direction when the second sealing member receives fluid pressure to be compressed and deform, and the height range of the first sealing member in the axis line direction when the first sealing member receives the fluid pressure to be compressed and deform at least partially overlap each other.

6. The valve device according to claim 4, wherein the position of the second sealing member providing portion of the housing in the axis line direction is located between the first sealing member providing portion of the valve seat body and an end portion of the housing, the end portion being located on the high-pressure side.

7. A valve device comprising:
a housing; and
the valve seat body according to claim 1, the valve seat body being accommodated in the housing; wherein:
the valve body is provided to be movable in the axis line direction between a closed position where the valve body is seated on the valve seat portion of the valve seat body, and an open position where the valve body separates from the valve seat portion; and
the first sealing member is provided at the first sealing member providing portion of the valve seat body to seal between the housing and the valve seat body.

8. The valve device according to claim 7, wherein:
the housing has a thick cylindrical shape and includes an accommodating portion formed at an inner periphery thereof and configured to accommodate the valve seat body, and a second sealing member providing portion formed on an outer periphery thereof and extending in a circumferential direction; and
a position of the second sealing member providing portion in the axis line direction overlaps the position of the first sealing member providing portion in the axis line direction or is located on the high-pressure side of the position of the first sealing member providing portion in the axis line direction.

9. The valve device according to claim 8, wherein:
a second sealing member is provided at the second sealing member providing portion; and
a height range of the second sealing member in the axis line direction when the second sealing member receives fluid pressure to be compressed and deform and the height range of the first sealing member in the axis line direction when the first sealing member receives the fluid pressure to be compressed and deform at least partially overlap each other.

10. The valve device according to claim 8, wherein the position of the second sealing member providing portion of the housing in the axis line direction is located between the first sealing member providing portion of the valve seat body and an end portion of the housing, the end portion being located on the high-pressure side.

11. A valve device comprising:
a housing having a thick cylindrical shape and including (i) an accommodating portion formed at an inner periphery thereof, the accommodating portion being configured to accommodate a valve seat body, and (ii) a second sealing member providing portion formed on an outer periphery thereof and extending in a circumferential direction;
the valve seat body is provided in the housing and has a thick cylindrical shape, the valve seat body including a first sealing member providing portion provided on an outer periphery of the valve seat body, a large-diameter portion and a small-diameter each of the large-diameter portion and the small-diameter portion being provided on an inner periphery of the valve seat body, and a valve seat portion provided between the large-diameter portion and the small-diameter portion;
a valve body that is provided to be movable in the axis line direction between a closed position where the valve body is seated on the valve seat portion of the valve seat body, and an open position where the valve body separates from the valve seat portion;
a first sealing member provided at the first sealing member providing portion of the valve seat body to seal between the housing and the valve seat body; and
a second sealing member provided at the second sealing member providing portion of the housing, wherein:
the large-diameter portion has an inner diameter larger than an outer diameter of the valve body configured to move into the large-diameter portion from an axis line direction;
the small-diameter portion has an inner diameter smaller than the outer diameter of the valve body;
a position of the first sealing member providing portion in the axis line direction overlaps a position of the valve seat portion in the axis line direction or is located on a high-pressure side of the position of the valve seat portion in the axis line direction; and a position of the second sealing member providing portion in the axis line direction overlaps the position of the first sealing member providing portion in the axis line direction.

12. The valve device according to claim 11, wherein:
a height range of the second sealing member in the axis line direction when the second sealing member receives fluid pressure to be compressed and deform, and a height range of the first sealing member in the axis line direction when the first sealing member receives the fluid pressure to be compressed and deform at least partially overlap each other.

13. The valve device according to claim 11, wherein:
a position of the valve seat portion in the axis line direction and a position of a contact portion of the first sealing member in the axis line direction overlap each other, the contact portion contacting the outer periphery of the valve seat body when the first sealing member receives fluid pressure to be compressed and deform.

14. The valve device according to claim 11, wherein:
the position of the valve seat portion in the axis line direction is located within a height range of the first sealing member in the axis line direction when the first sealing member receives fluid pressure to be compressed and deform.

15. The valve device according to claim 11, wherein:
the position of the first sealing member providing portion of the valve seat body in the axis line direction is located between the valve seat portion of the valve seat body and an end portion of the valve seat body, the end portion being located on the high-pressure side.

* * * * *